United States Patent
Wachi

(10) Patent No.: US 7,477,346 B2
(45) Date of Patent: Jan. 13, 2009

(54) TRANSFLECTIVE LIQUID CRYSTAL DISPLAY DEVICE AND ELECTRONIC APPARATUS WITH SLOPE PORTION BETWEEN NEIGHBORING REFLECTIVE AND TRANSPARENT PIXEL ELECTRODES

(75) Inventor: Reiko Wachi, Suwa (JP)

(73) Assignee: Seiko Epson Corporation (JP)

( * ) Notice: Subject to any disclaimer, the term of this patent is extended or adjusted under 35 U.S.C. 154(b) by 406 days.

(21) Appl. No.: 11/044,900

(22) Filed: Jan. 27, 2005

(65) Prior Publication Data

US 2005/0162597 A1 Jul. 28, 2005

(30) Foreign Application Priority Data

Jan. 28, 2004 (JP) ............... 2004-019731
Nov. 2, 2004 (JP) ............... 2004-318806

(51) Int. Cl.
G02F 1/1335 (2006.01)
(52) U.S. Cl. ............... 349/114; 349/138; 349/143
(58) Field of Classification Search ............... 349/114
See application file for complete search history.

(56) References Cited

U.S. PATENT DOCUMENTS

| | | | |
|---|---|---|---|
| 6,208,402 B1 | 3/2001 | Tajima | |
| 6,573,965 B1 | 6/2003 | Liu et al. | |
| 6,628,367 B2 | 9/2003 | Hirabayashi | |
| 6,829,070 B2 | 12/2004 | Adachi | |
| 6,919,944 B2 | 7/2005 | Maeda | |
| 7,119,861 B2 * | 10/2006 | Tsuchiya et al. | ............ 349/108 |
| 2002/0021402 A1 | 2/2002 | Hirabayashi et al. | |
| 2002/0075441 A1* | 6/2002 | Fujimori et al. | ............ 349/155 |
| 2003/0133062 A1* | 7/2003 | Maeda | ............ 349/113 |
| 2003/0160928 A1 | 8/2003 | Ozawa et al. | |
| 2004/0135945 A1* | 7/2004 | Choi et al. | ............ 349/114 |
| 2007/0024797 A1* | 2/2007 | Shimizu et al. | ............ 349/155 |

FOREIGN PATENT DOCUMENTS

| | | |
|---|---|---|
| CN | 1336632 | 2/2002 |
| CN | 1424616 | 6/2003 |
| CN | 1441304 | 9/2003 |
| JP | 60-159831 | 8/1985 |

(Continued)

OTHER PUBLICATIONS

Communication from European Patent Office re: related application.

*Primary Examiner*—Andrew Schechter
*Assistant Examiner*—Nathanael R Briggs
(74) *Attorney, Agent, or Firm*—Harness, Dickey & Pierce, P.L.C.

(57) ABSTRACT

A liquid crystal display device is provided having excellent contrast and an electronic apparatus using the same, including a first substrate having first wiring patterns thereon; a second substrate having second wiring patterns thereon, wherein the second wiring patterns are placed opposite to the first wiring pattern; and a liquid crystal material interposed between the first substrate and the second substrate, wherein a step is arranged in the liquid crystal display device, and wherein a formation position of a gap between the adjacent first wiring patterns or between the adjacent second wiring patterns and a formation position of the steps which directly or indirectly contact with the liquid crystal material, match.

16 Claims, 16 Drawing Sheets

FOREIGN PATENT DOCUMENTS

| | | |
|---|---|---|
| JP | 11-242226 | 9/1999 |
| JP | 2003-167253 | 6/2003 |
| JP | 2003-172923 A | 6/2003 |
| JP | 2003-248221 | 9/2003 |
| JP | 2003-270628 A | 9/2003 |
| JP | 2003-279959 | 10/2003 |
| JP | 2003-295165 | 10/2003 |
| JP | 2004-020907 A | 1/2004 |

* cited by examiner

TRANSFLECTIVE LIQUID CRYSTAL DISPLAY DEVICE AND ELECTRONIC APPARATUS WITH SLOPE PORTION BETWEEN NEIGHBORING REFLECTIVE AND TRANSPARENT PIXEL ELECTRODES

RELATED APPLICATIONS

This application claims priority to Japanese Patent Application Nos. 2004-019731 filed Jan. 28, 2004 and 2004-318806 filed Nov. 2, 2004 which are hereby expressly incorporated by reference herein in their entirety.

BACKGROUND

1. Technical Field

The present invention relates to a liquid crystal display device and an electronic apparatus comprising the liquid crystal display device, and more specifically, to a liquid crystal display device having an excellent contrast and to an electronic apparatus comprising the liquid crystal display device.

2. Related Art

Conventionally, liquid crystal display devices comprising a first substrate having first wiring patterns, a second substrate having second wiring patterns, a sealant arranged along peripheries of the first and second substrates to adhere the first and second substrates, and a liquid crystal material interposed between the first and second substrates have been widely used.

Specifically, in such widely used liquid crystal display devices, a plurality of pixels formed at a region where the first wiring patterns formed on the first substrate serving as one substrate and the second wiring patterns formed on the second substrate serving as the other substrate intersect perpendicularly are arranged in a dot matrix, and light transmitted through the liquid crystal material of the pixels is demodulated by turning on and off a voltage applied to the pixels so that images such as characters are displayed by using a polarization plate.

In addition, as shown in FIG. 21, a so-called multiple gaps liquid crystal display device 700 has been proposed to realize a superior color display with suitable retardation in both reflection and transmission modes (for example, see Japanese Unexamined Patent Application Publication No. 2003-248221). More specifically, the liquid crystal display device 700 has multiple gaps, and is configured such that the surface of a liquid crystal layer 730 in the region corresponding to a light reflecting portion 712 of a transflective layer protrudes more than a surface of a liquid crystal layer 730 in the region corresponding to a light transmitting portion 717 of the transflective layer.

However, the liquid crystal display device disclosed in Japanese Unexamined Patent Application Publication No. 2003-248221 does not take into account the position of a step caused by the multiple gaps formed to adjust the retardation and the position of gaps between the first wiring patterns or between the second wiring patterns. Moreover, due to the misalignment, the steps are formed even in the middle of the wiring patterns such that an alignment defects in the pixels is readily noticeable, and the contrast becomes low.

Specifically, as schematically indicated by FIG. 6(b), the above-mentioned liquid crystal display device has a problem in that an area in which the alignment defects is noticeable in the pixel is relatively large.

SUMMARY

Therefore, according to the present invention, a step formation position in a liquid crystal display device and a gap formation position between the adjacent wiring patterns match each other, so that the alignment defects and defect noticeability caused by the step can be reduced. As a result, a liquid crystal material having an improved contrast can be obtained.

Specifically, an object of the present invention is to provide a liquid crystal display device having an excellent contrast and an electronic apparatus comprising the same, by reducing the alignment defects of the liquid crystal material or the defect noticeability due to the steps arranged in the liquid crystal display device (in the cell), which directly or indirectly contact the liquid crystal material.

According to an aspect of the present invention, there is provided a liquid crystal display device comprising: a first substrate having first wiring patterns thereon; a second substrate having second wiring patterns thereon, wherein the second wiring patterns are placed opposite to the first wiring pattern; and a liquid crystal material interposed between the first substrate and the second substrate, wherein a gap is formed between the adjacent first wiring patterns and the adjacent second wiring patterns, wherein a gap is an electrical insulating region, wherein a step is formed on the first or second substrate, and wherein the gap is formed at a position matching a formation position of the steps which directly or indirectly contact the liquid crystal material, and the above-mentioned problems can be solved.

With the above liquid crystal display device, the formation position of the step arranged in the liquid crystal display device which directly or indirectly contacts the liquid crystal material and the formation position of the gap between the adjacent first wiring patterns and between the adjacent second wiring patterns match each other, so that the alignment defects of the liquid crystal material due to the step can be effectively reduced, or even when the alignment defects of the liquid crystal material is provided due to the step, noticeability of alignment defects formed on an image screen can be reduced.

In addition, the first wiring patterns or the second wiring patterns typically refer to a plurality of electrodes patterned on the respective substrates. Therefore, for the active matrix liquid crystal display device having a TFD device, the first wiring pattern refers to a scanning electrode and the second wiring patterns refer to pixel electrodes. Further, a gap between the adjacent wiring patterns refers to an electrical insulating region interposed between the adjacent electrodes for the respective first wiring patterns and second wiring patterns.

Moreover, since a certain degree of improvement in contrast can be achieved, the step formation position and the gap formation position need not perfectly match, but may partially match in a longitudinal direction or width direction of the wiring pattern.

In other words, by matching an entire predetermined step formed in one pixel to the gap between the adjacent wiring patterns, the alignment defects or the defect noticeability caused by the predetermined step can be reduced. However, by matching part of the predetermined step formed in one pixel to the gap between the adjacent wiring patterns, the alignment defects or the defect noticeability due to the predetermined step can be reduced while preventing the pixel area from being excessively reduced.

In addition, in the liquid crystal display device of the present invention, the insulating gap is preferably slit shaped.

In other words, with the slit-type gap, the gaps are easily formed according to the steps, and the alignment defects and defect noticeability due to the step can be reduced while preventing the pixel area from being excessively reduced. In addition, since the gap is in a slip-type, the gap easily matches the step and a certain degree of insulating property of the gap can be reliably obtained.

In addition, in the liquid crystal display device of the present invention, the width of the step is preferably the same as the width of the gap.

In other words, since the width of the step and the width of the gap between the adjacent wiring patterns are the same, the alignment defects and defect noticeability due to the step can be reduced, while preventing the pixel area from being excessively reduced.

In addition, in the liquid crystal display device of the present invention, the width of the step may be smaller than the width of the gap.

In other words, by associating the width of the step with the width of the gap between the adjacent wiring patterns as described above, the alignment defects and defect noticeability due to the step can be reduced.

Here, the width of the step refers to the width of a region comprising an upper portion and a lower portion of the step when the substrate is seen in a vertical direction.

In addition, in the liquid crystal display device of the present invention, the width of the gap may be smaller than the width of the step.

In other words, by associating the width of the step and the width of the gap between the adjacent wiring patterns as described above, the alignment defects and defect noticeability due to the step can be reduced, while preventing the pixel area from being excessively reduced.

In addition, in the liquid crystal display device of the present invention, the width of the gap is preferably 1~50 µm.

In other words, with a predetermined range of the gap between the adjacent wiring patterns, the alignment defects and defect noticeability can be reduced in the pixel. As a result, the liquid crystal display device having an excellent contrast can be provided.

In addition, in the liquid crystal display device of the present invention, the step may comprise a slope portion.

In other words, with the slope portion, e.g., a tapered step, the gap between the adjacent wiring patterns for the first wiring patterns or the second wiring patterns can be accurately formed so that the formation position of the step can accurately match.

In addition, in the liquid crystal display device of the present invention, the steps may be formed due to a multiple gaps formed for adjusting retardation.

In other words, with the multiple gaps for retardation, the alignment defect due to the step formed can be relatively reduced so that the liquid crystal display device having an excellent contrast can be provided.

In addition, in the liquid crystal display device of the present invention, the steps may be formed due to a light shielding layer.

In other words, by superposing the light shielding layer, the alignment defect due to the step formed in the pixel can be relatively reduced so that the liquid crystal display device having an excellent contrast can be provided.

In addition, in the liquid crystal display device of the present invention, the step may be formed due to an alignment protrusion formed for alignment control.

In other words, the alignment defect due to the step formed in the case of forming the alignment protrusion for alignment control can be relatively reduced so that the liquid crystal display device having an excellent contrast can be provided.

In addition, in the liquid crystal display device of the present invention, the steps may be formed due to an interlayer insulating layer.

In other words, the alignment defect due to the step formed by the interlayer insulating layer can be relatively reduced so that the liquid crystal display device having an excellent contrast can be provided.

In addition, in the liquid crystal display device of the present invention, the step may be formed due to a photo spacer.

In other words, with the photo spacer, the alignment defect due to the step formed in the pixel can be relatively reduced so that the liquid crystal display device having an excellent contrast can be provided.

In addition, in the liquid crystal display device of the present invention, the steps may be formed due to a reflective scattering layer.

In other words, with the reflective scattering layer, the alignment defect or the reflective scattering defect due to the step formed in the pixel can be relatively reduced so that the liquid crystal display device having an excellent contrast can be provided.

In addition, in the liquid crystal display device of the present invention, the steps may comprise an upper flat portion, a slope portion, and a lower flat portion, and one edge of the gaps may be arranged on the upper flat portion of the steps, and the other edge of the gaps may be arranged on the lower flat portion of the steps.

In other words, with the above arrangement, the wiring patterns are not arranged on a position corresponding to the predetermined step, so that the alignment defect and defect noticeability of the liquid crystal material due to the related step can be reduced. As a result, the liquid crystal display device having an excellent contrast can be provided.

In addition, in the liquid crystal display device of the present invention, the steps may comprise an upper flat portion, a slope portion, and a lower flat portion, and one edge of the gaps may be arranged on an upper part of the slope portion of the steps, and the other edge of the gaps may be arranged on the lower flat portion of the steps.

In other words, with the above arrangement, the wiring patterns arranged on the positions corresponding to the predetermined step can be reduced, so that the alignment defect and defect noticeability of the liquid crystal material can be reduced. In addition, the liquid crystal display device capable of displaying a bright screen can be provided since the reduction of the pixel area is prevented.

In addition, in the liquid crystal display device of the present invention, the steps may comprise an upper flat. portion, a. slope portion, and a lower flat portion, and one edge of the gaps may be arranged on an upper flat portion of the steps, and the other edge of the gaps may be arranged on a lower part of the slope portion of the steps.

In other words, with the above arrangement, the wiring patterns arranged on the positions corresponding to the predetermined step can be reduced, so that the alignment defect and defect noticeability of the liquid crystal material can be reduced. In addition, the liquid crystal display device capable of displaying a bright screen can be provided since the reduction of the pixel area is prevented.

In addition, in the liquid crystal display device of the present invention, the steps may comprise an upper flat portion, a slope portion, and a lower flat portion, and one edge of the gaps may be arranged on an upper part of the slope portion of the steps, and the other edge of the gaps may be arranged on a lower part of the slope portion of the steps.

With the above arrangement, by reducing the wiring patterns arranged on the positions corresponding to the predetermined step so that the alignment defect and defect noticeability of the liquid crystal material can be reduced. In addition, the liquid crystal display device capable of displaying a bright screen can be provided since the pixel area can become as large as possible.

In addition, in the liquid crystal display device of the present invention, for any one edge of the gaps, the edge arranged on the upper flat portion or the lower flat portion of the steps may match a boundary between the upper flat portion and the slope portion, or a boundary between the lower flat portion and the slope portion.

With the above arrangement, the gap between the adjacent wiring patterns can be prevented from being excessively increased in obtaining a pixel area so that the brightness of the displayed image is not degraded.

In addition, in the liquid crystal display device of the present invention, the first substrate may be a color filter substrate having a color filter, and the second substrate may be a switching substrate having a switching device.

With the above arrangement, the liquid crystal display device capable of recognizing a color image with a fast response speed and contrast can be provided.

In another aspect of the present invention, there is provided an electronic apparatus comprising at least one of the above-mentioned liquid crystal display devices.

In other words, the alignment defect and defect noticeability in the pixel can be reduced so that the electronic apparatus having the liquid crystal display device having an excellent contrast can be provided.

DETAILED DESCRIPTION

Figure 1:
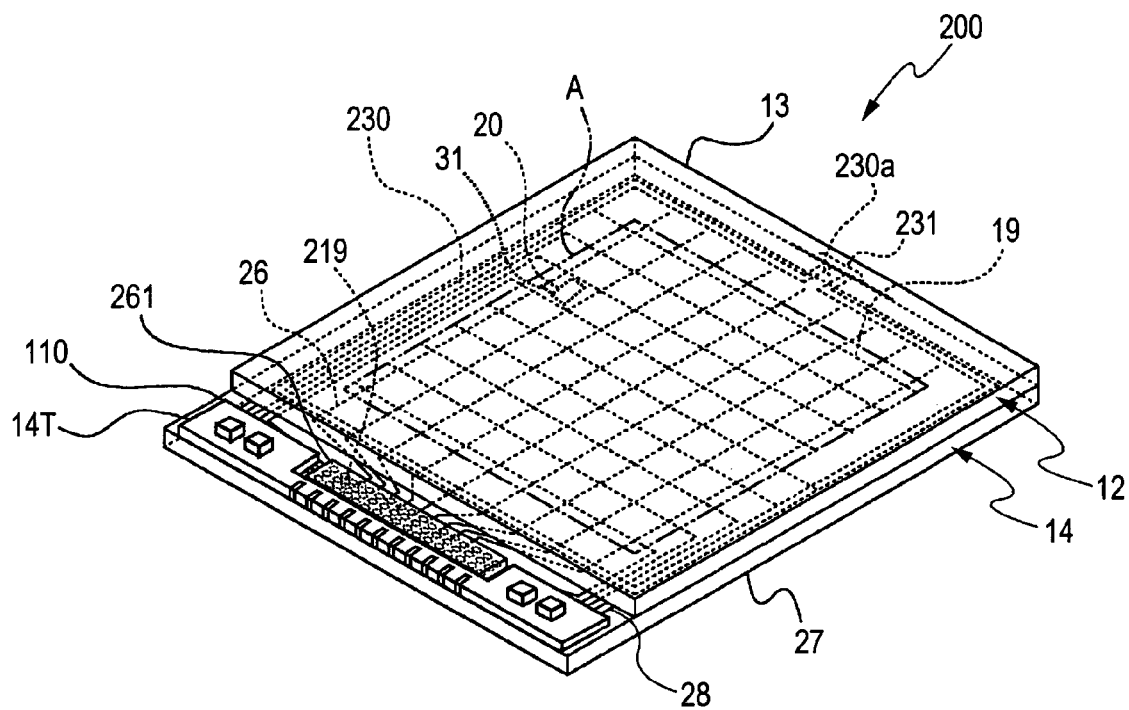
FIG. 1 is a schematic perspective view showing a liquid crystal panel comprising a liquid crystal display device according to a first embodiment of the present invention.

A liquid crystal display device and an electronic apparatus comprising the liquid crystal display device according to exemplary embodiments of the present invention will now be described with reference to the attached drawings.

However, the exemplary embodiments are just illustrative: the invention is not limited thereto, and any modification can be made within the scope of the present invention.

First Embodiment

According to the first embodiment of the present invention, a liquid crystal display device comprises a pair of substrates including a first substrate having first wiring patterns and a second substrate, which is opposite to the first substrate, having second wiring patterns, and a liquid crystal material interposed between the first substrate and the second substrate. In addition, gaps, which are an electrical insulating region, are formed between the adjacent first wiring patterns and between the adjacent second wiring patterns. Here, a step is formed on the first or second substrate. In addition, the gap is formed at a position matching the formation position of the steps which directly or indirectly contact with the liquid crystal material.

Specifically, the formation position of the step arranged in the liquid crystal display device and directly or indirectly contacts the liquid crystal material matches the formation position of the gap, which is an insulating region, between the adjacent first wiring patterns or the adjacent second wiring patterns.

Therefore, with the above-mentioned liquid crystal display device, the alignment defect of the liquid crystal material due to a step caused by multiple gaps arranged in the liquid crystal display device, such as an alignment protrusion for alignment control, an interlayer insulating layer, a photo spacer, a reflective scattering layer, or an organic or inorganic layer can be reduced. Accordingly, the degradation of the contrast of the liquid crystal display device can be prevented.

The liquid crystal display device according to the first embodiment of the present invention will now be described with reference to FIGS. 1 to 12 in the context of a liquid crystal display device comprising a first substrate (also referred to as a color filter substrate) having scanning electrodes as first wiring patterns, and a second substrate (also referred to as a device substrate) having pixel electrodes as second wiring patterns and a TFD (thin layer diode) device.

However, the present invention is not limited thereto: an active matrix liquid crystal display device using a nonlinear device such as a thin film transistor (TFT) device or a passive matrix liquid crystal display device can also be used.

1. Basic Construction of Liquid Crystal Display Device

First, the basic construction of the liquid crystal display device according to the first embodiment of the present invention, i.e., a liquid crystal panel or a wiring pattern or a retardation layer, and a polarization plate will be specifically described with reference to FIGS. 1 and 2.

Figure 2:
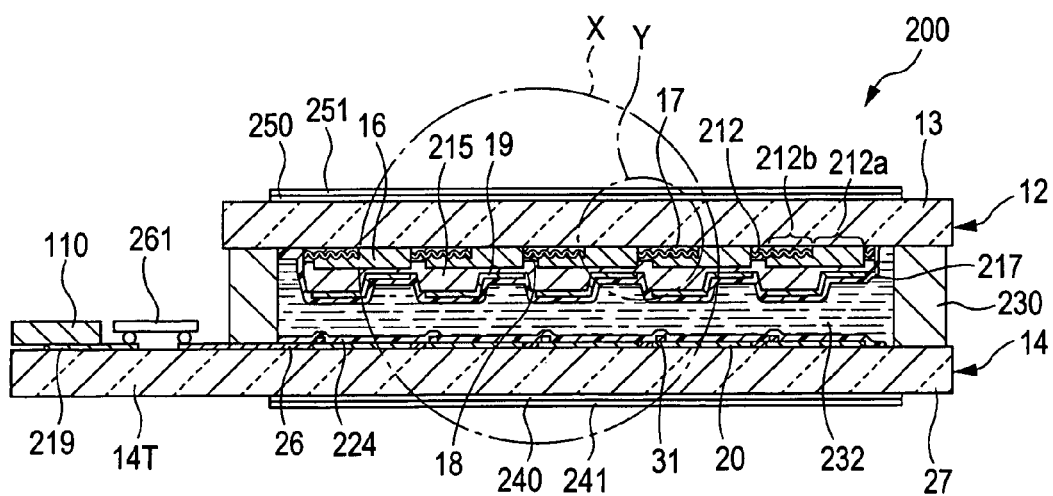
FIG. 2 is a schematic cross sectional view showing a liquid crystal display. device according to the first embodiment of the present invention.

Here, FIG. 1 is a schematic perspective view showing a liquid crystal panel 200 comprising a liquid crystal display device according to the first embodiment of the present invention, and FIG. 2 is a schematic cross sectional view of the liquid crystal panel 200. For the sake of convenience of illustration, a first substrate 12 is arranged at an upper side and a second substrate 14 is arranged at a lower side.

In addition, the liquid crystal panel 200 shown in FIG. 1 is in an active matrix type having TFD devices, as described above, and may further comprise a lighting apparatus such as a backlight or a front light and a case body, if needed.

(1) Cell Structure

As shown in FIG. 1, in the liquid crystal panel display 200, the first substrate 12 using a first glass substrate 13 as a base body is adhered to the second substrate 14 using a second glass substrate 27 as a base body, by interposing adhesives, such as a sealant 230, therebetween. In addition, a cell is arranged such that a liquid crystal is injected into the sealant 230 via an opening 230a into a space enclosed by the first substrate 12 and the second substrate 14, and is sealed with a sealing material 231. In other words, as shown in FIG. 2, a liquid crystal material 232 is preferably filled and sealed between the first substrate 12 and the second substrate 14.

(2) Line Pattern

As shown in FIG. 1, a plurality of scanning electrodes 19 are formed on the first glass substrate 13 as first wiring patterns. In addition, data lines 26, TFD devices 31, scroll lines 28 as well as pixel electrodes 20 are formed as the second wiring patterns on the inner surface of the second glass substrate 27. Further, a region where the scanning electrodes 19 serving as the first wiring patterns and the pixel electrodes 20 serving as the second wiring patterns are overlapped in plan view to form in a matrix, constituting a liquid crystal display device region A as a whole.

As shown in FIG. 1, preferably, the second substrate 14 has a substrate extension part 14T extending outwardly more than the first substrate 12, and data lines 26 or an input terminal unit (external connection terminal) 219 are formed on the substrate extension part 14T.

In addition, a semiconductor device (IC) 261 with an embedded liquid crystal driving circuit is preferably mounted on the substrate extension part 14T such that the components are conductively connected to the data lines 26 and the input terminal unit (external connection terminal) 219.

Moreover, a flexible line substrate 110 is preferably mounted on the end of the substrate extension part 14T so as to be conductively connected to the input terminal unit (external connection terminal) 219.

(3) Retardation Layer and Polarization Plate

In the liquid crystal panel 200 shown in FIG. 1, a retardation layer (¼ wavelength layer) 250 and a polarization plate 251 are arranged at a predetermined position of the first substrate 12, as shown in the cross-sectional view of FIG. 2. In addition, a retardation layer (¼ wavelength layer) 240 and a polarization plate 241 are also arranged on the outer surface of the second substrate 14. In other words, the phases of incident light into the liquid crystal panel 200 and the transmission light therefrom are respectively adjusted by the retardation layers (¼ wavelength layers) 250 and 240 and polarization plates 251 and 241, thereby displaying sharp images.

(4) Liquid Crystal Material

In addition, the liquid crystal display device according to the present invention may be a normally black mode using a vertically aligned liquid crystal material, or may be a normally white mode. In either case, as described later, the formation position of the predetermined step matches the formation position of the gap between the adjacent wiring patterns. Therefore, the alignment defect of the liquid crystal material can be reduced, and even when the alignment defect of the liquid crystal material is generated due to the step, the alignment defect region may not be noticeable due to the gap between the wiring patterns.

2. First Substrate (1) Basic Construction

As shown in FIG. 2, it is desirable that the first substrate 12 largely comprise the first glass substrate 13, a colored layer 16, a light shielding layer 16, and scanning electrodes 19 as the first wiring patterns.

In addition, for the first substrate 12, when the reflection is required, for example, for a transflective liquid crystal display device used in an apparatus such as a cellular phone, a reflection layer (a transflective layer) 212 is interposed between the first glass substrate 13 and the colored layer 16, as shown in FIG. 2.

Moreover, as shown in FIG. 2, the colored layer 16 is formed for each pixel in the first substrate 12, and is covered with a planarization layer (surface protection layer or overcoat layer) 215 made of transparent resin, such as acrylic resin or epoxy resin. Likewise, a color filter having the colored layer 16 and the planarization layer (surface protective layer) 215 is formed. Furthermore, an insulating layer (not shown) may be arranged to improve the insulating properties.

In addition, although the colored layer 16 is arranged on the first glass substrate 13 in an example of the liquid crystal display device according to the first embodiment of the present invention, the colored layer may be arranged on the second glass substrate 14 as described below.

(2) Colored Layer

In addition, the colored layer 16 shown in FIG. 2 generally contains a coloring material such as pigment or dye dispersed into a transparent material to represent a predetermined color. As an example of a color of the colored layer, there is a primary color filter comprising three color components including R (red), G (green), and B (blue). However, the present invention is not limited thereto, and a complementary color system such as Y (yellow), M (magenta), and C (cyan), or various other colors can be used.

For the coloring layer, a color resist made of photosensitive resin comprising coloring material such as pigment or dye is typically applied on the surface of the substrate, and an unnecessary portion is removed through photolithography (etching) to form the colored layer having a predetermined color pattern. In addition, in order to form the colored layer having a plurality of color components, the process is repeatedly performed.

In addition, the arrangement pattern of the colored layer may be a stripe, but it may employ various other shapes such as a mosaic or delta arrangement.

(3) Light Shielding Layer

In addition, a light shielding layer (also referred to as a black matrix) 18 is preferably formed at a pixel region between pixels of the colored layer 16 for each pixel, as shown in FIG. 2.

The light shielding layer 18 may use, for example, three coloring materials including R (red) component, G (green) component, and B (blue) component all dispersed into the base substance other than the resin, or black pigment or dye dispersed into the base substance other than the resin. In addition, since an excellent shielding effect can be obtained without black material such as carbon, three layers of R (red), G (green), and B (blue) may be provided using color addition.

(4) Reflection Layer

In addition, a reflection layer 212 is preferably formed on the surface of the first glass substrate 13, as shown in FIG. 2. The reflection layer 212 is preferably made of a metal thin layer containing at least one of Al, Al alloy, Cr, Cr alloy, Ag, and Ag alloy. In addition, each pixel are preferably provided with a reflecting portion 212b having a reflection face and a transmission part 212a. In other words, in the transflective liquid crystal display device, the region corresponding to the transmission part 212a displays images in a transmission mode, and the region corresponding to the reflecting portion 212b display images in a reflection mode.

(5) Reflective Scattering Layer

Further, as shown in FIG. 2, a reflective scattering layer 17 is preferably formed below the reflecting portion 212b of the first glass substrate to prevent specular reflection of the reflection layer 212. The reflective scattering layer 17 may be formed using a photosensitive resin having polyimide resin, epoxy resin, acrylic resin, urethan resin, polyester resin, polyolefin resin, or phenol novolac resin as a primary component.

(6) First Wiring Pattern (Scanning Electrode)

Further, as shown in FIG. 2, scanning electrodes 19 are formed on the planarization layer 215 as first wiring patterns made of a transparent conductive material, such as ITO (Indium Tin oxide). In other words, the scanning electrodes 19 are preferably arranged in the form of strips by placing a plurality of transparent electrodes in parallel.

In addition, the thickness of the scanning electrode layer is preferably 100 to 200 μm, and more preferably, 120 to 170 μm. This is because the electrical resistance excessively increases when the thickness of the scanning electrode layer is less than 100 μm. Further, when the thickness of the scanning electrode layer exceeds 200 μm, the gap of the cell may become irregular or it may be difficult to obtain a thin layer in the liquid crystal display device.

In addition, when the step is formed in the scanning electrode, the height difference of the step is preferably 5 μm or less to prevent the scanning electrode in the step from becoming disconnected.

(7) Alignment Layer

In addition, as shown in FIG. 2, a first alignment layer 217 made of polyimide resin is preferably formed on the scanning electrode 19.

This is because the liquid crystal material 232 may be easily aligned by applying the voltage, by forming such a first alignment layer 217 in the case where the color filter substrate 12 is used for a liquid crystal display device.

3. Second Substrate

Basic Construction

As shown in FIGS. 1 and 2, the second substrate 14 largely comprises the second glass substrate 27, data lines 26, pixel electrodes 20 as the second wiring patterns, TFD devices 31 for electrically connecting these components, and scroll lines 28 connected to the scanning electrodes 19 of the first substrate.

In addition, as shown in FIG. 2, a second alignment layer 224 made of a polyimide resin is formed on the pixel electrode 20. With the second alignment layer 224, the alignment of the liquid crystal material is controlled.

(2) Second Wiring Pattern (Ixel Lectrode), etc.

Figure 3A:
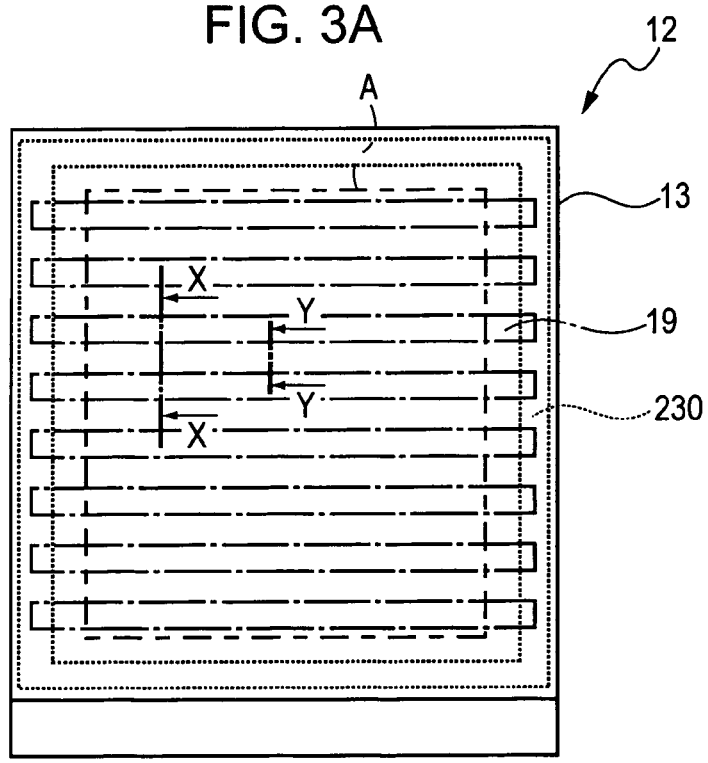
FIG. 3(a) is a schematic plan view showing a first substrate of a liquid crystal display device.
Figure 3B:
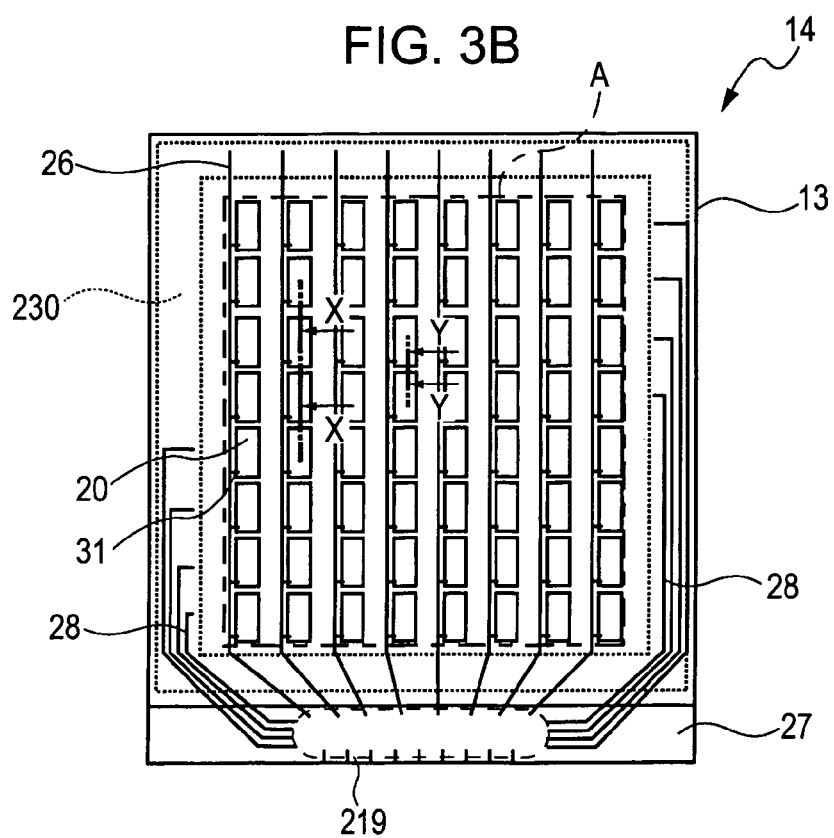
FIG. 3(b) is a schematic plan view showing a second substrate of a liquid crystal display device.

In addition, as shown in FIG. 3(b), the pixel electrodes 20 as the second wiring patterns, data lines 26, and the TFD devices 31 are arranged on the second substrate 14. The pixel electrode 20 described above is connected to the data line placed in parallel via the respective TFD device 31, as shown in FIG. 3(b).

Figure 4:
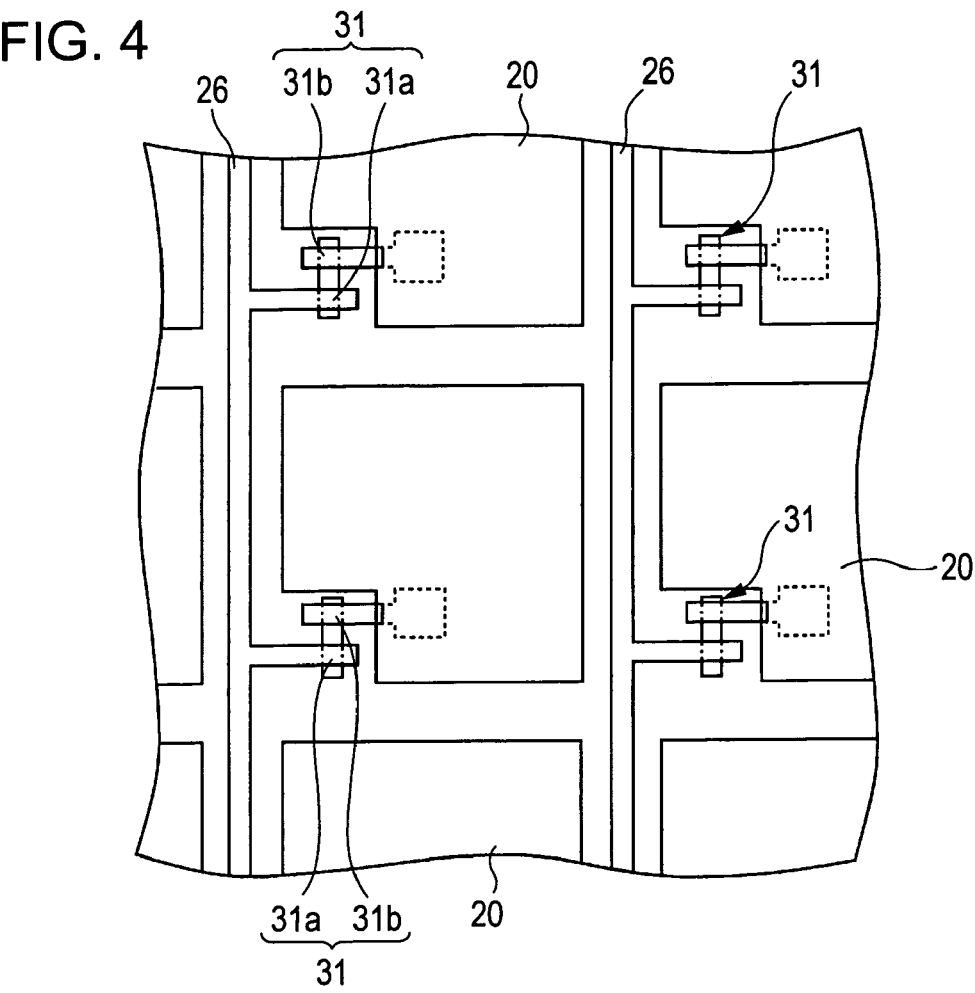
FIG. 4 is a diagram for illustrating an arrangement of a TFD device.

In addition, the TFD device 31 has a stable device operation, as shown in the schematic plan view of FIG. 4. Thus, it is desirable that a so-called back-to-back TFD device 31 be included where the first TFD device 31a and the second TFD device 31b placed in series in opposite directions. With the above arrangement, the data line 26 is connected to the terminal at one side of the TFD device 31, and the pixel electrode 20 is connected to the terminal at the other side of the TFD device 31.

In addition, preferably, as shown in FIG. 3(b), the data line 26 is formed to extend to the substrate extension part 14T in the first glass substrate 27 outside the sealant 230, and one terminal is used as the external connection terminal.

4. Positional Relation Between Step and Line Gap

Figure 5:
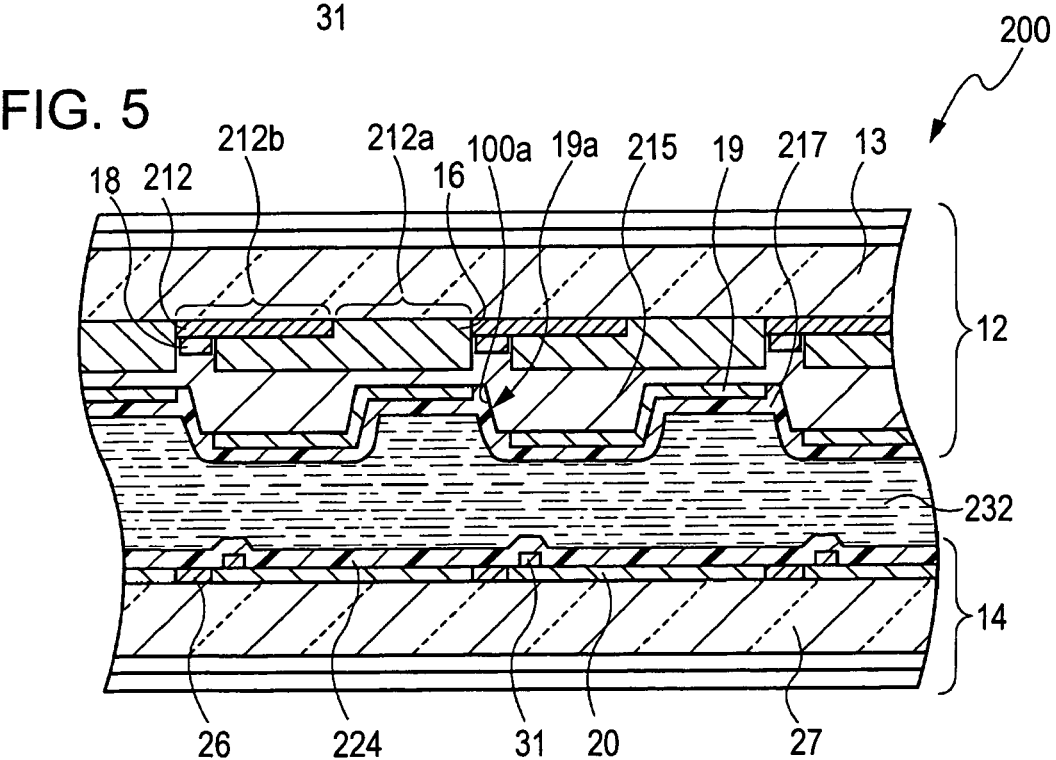
FIG. 5 is a diagram for illustrating a step formed due to multiple gaps.

FIG. 5 is an enlarged diagram showing a portion enclosed by X in FIG. 2 (corresponding to the X-X cross-sectional seen in the arrow direction of FIG. 3). As illustrated in the example in FIG. 5, in the liquid crystal display device of the first embodiment, the formation position of the step 100a arranged inside the cell of the liquid crystal panel 200, the step directly or indirectly contacting the liquid crystal material 232, matches the formation position of the gap 19a between the adjacent scanning electrodes 19. In FIG. 5, the formation position of the step 100a obtained by forming multiple gaps for attempting to have an appropriate retardation in the reflection region and the transmission region preferably matches the formation position of the gap 19a, which is an insulating region, formed between the adjacent scanning electrodes 19.

By doing so, since the formation position of the step and the formation position of the gap between the adjacent scanning lines match, the scanning electrode constituting an electric field area may not substantially exist in the step, and the alignment defect of the liquid crystal material due to the step can be prevented. Therefore, the alignment defect or the defect noticeability in the pixel can be reduced, and consequently, a liquid crystal display device having an excellent contrast can be provided.

In addition, the formation position of the step may directly contact with the liquid crystal material, or may indirectly contact the liquid crystal material by interposing the alignment layer therebetween. Further, a detailed example of the step will be described later.

Figure 6A:
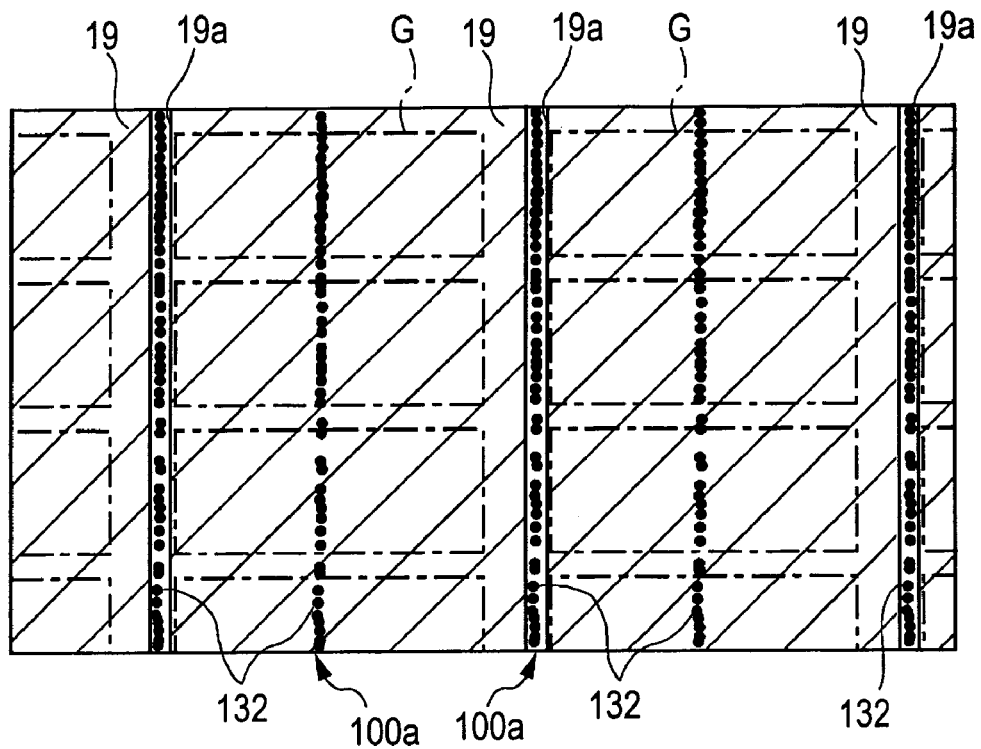
FIGS. 6(a) and 6(b) are diagrams for illustrating the improved recognition ratio of alignment defects.
Figure 6B:
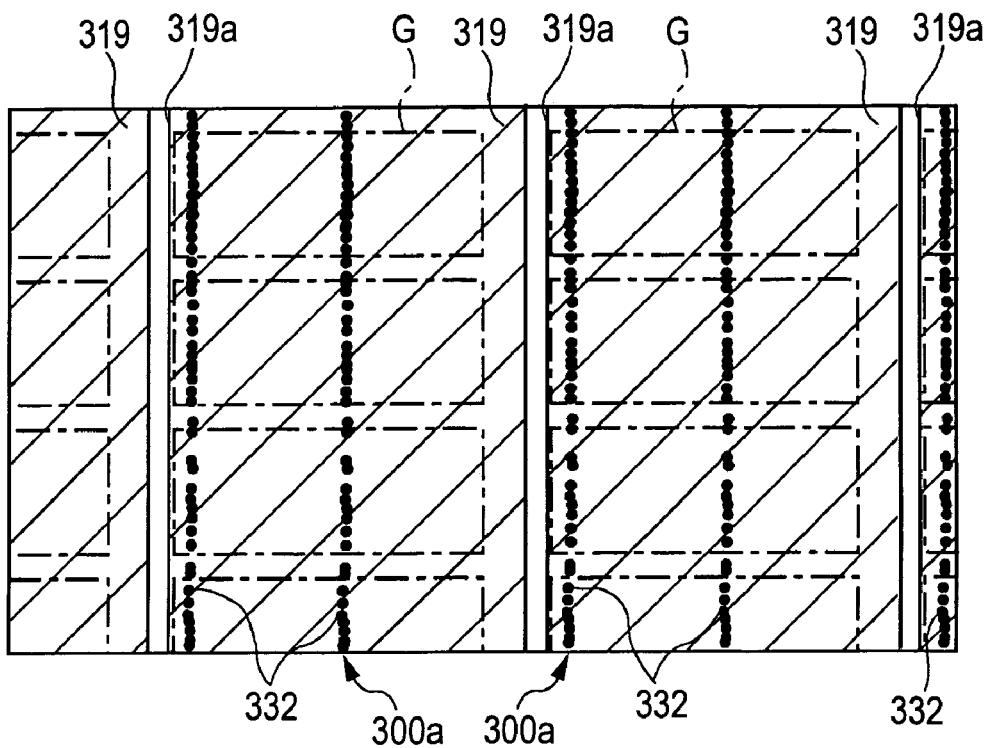

Here, the reduction of the alignment defect or the defect noticeability will now be described with reference to FIG. 6. FIGS. 6(a) and 6(b) are diagrams showing a liquid crystal display device seen from the display surface. Further, FIG. 6(a) is an example of a liquid crystal display device where the formation position of the step 100a due to the multiple gaps and the formation position of the gap 10a between the adjacent scanning electrodes 19 match, and FIG. 6(b) is an example of a liquid crystal display device where the formation position of the step 300a due to the multiple gaps and the formation position of the gap 319a between the adjacent scanning electrodes 319 do not match.

In the example shown in FIG. 6(a), for one pixel G, the alignment defect 132 is generated in a series of dots in a step 100a' whose formation position do not match that of the gap 19a between the scanning electrodes 19, while the alignment defect of the liquid crystal material is covered in the step 100a whose formation position matches that of the gap 10a between the scanning electrodes 19 due to the existence of the scanning electrode 19. Therefore, it will be appreciated that the alignment defect and the defect noticeability of the liquid crystal material can be reduced to improve the contrast of the image display.

On the contrary, in the example shown in FIG. 6(b), the defect alignment 332 of the liquid crystal material 323 is generated in the entire step 300a in a series of dots, without matching the formation position of the gap 319a between the scanning electrodes 319, or in a non-electric field area. Therefore, the alignment defect region (image non-viewing region) in the pixel G becomes larger. Thus, it will be appreciated that the normal alignment region (image viewing region) available to the pixel G becomes smaller, and the contrast is degraded due to the alignment defect 332 of the liquid crystal material.

In addition, with respect to the positional relation of the predetermined step and the gap between the adjacent wiring patterns, the step may be formed on the first substrate such that the formation position of the related step and the formation position of the gap between the adjacent first wiring patterns (scanning electrodes) arranged on the first substrate match. Alternatively, the step may be formed on the counter second substrate such that the formation position of the related step and the formation position of the gap between the second wiring patterns (pixel electrodes) arranged on the second substrate match.

With the above arrangement, since the formation position of the step in the cell matches the formation position of the gap between the adjacent wiring patterns in the wiring patterns of the same substrate, as described above, the wiring pattern may not exist in the related step, and the alignment defect of the liquid crystal material can be effectively suppressed.

Further, the formation position of the predetermined step and the formation position of the gap between the adjacent wiring patterns in the substrate facing the substrate where the step is formed may match. With the above arrangement, even when the alignment defect of the liquid crystal material is generated due to the step, it can be covered with the gap between the wiring patterns where the images are not originally displayed so that the viewing region can be reduced.

In other words, for the active matrix liquid crystal display device having TFD devices according to the present embodiment, the formation position of the step formed on one of the substrates matches the formation position of the gap between the pixel electrodes or the gap between the scanning electrodes formed along the alignment direction of the related step. Thus, a liquid crystal display device having an excellent contrast can be provided.

In addition, all or part of the formation position of the gap between the adjacent wiring patterns in one pixel may match the formation position of the step. In other words, the formation position of the gap between the adjacent wiring patterns and the formation position of the predetermined step may match entirely, or alternatively, the formation position of the gap between the adjacent wiring patterns and the formation position of the predetermined step may match partially.

By doing so, when the formation position of the gap entirely matches the formation position of the step, the alignment defect of the liquid crystal material due to the related step may not be recognizable as much as possible. Therefore, the contrast of the displayed image can be improved.

Further, when the formation position of the gap partially matches the formation position of the step, it is not necessary to form an excessively large gap between the adjacent wiring patterns. Therefore, the reduction of the pixel area can be prevented. Thus, when the formation position of the gap between the adjacent predetermined wiring patterns in one pixel on the substrate partially matches the formation position of the step, for example, when the formation position of the gap matches the formation position of the step in a range of 20 to 80%, it is found that contrast of various liquid crystal display device is improved by about 1 to 30%.

More specifically, in the example of FIG. 6(a), for one pixel G, the formation position of the gap 19a between the adjacent scanning electrodes 19 matches one of the two steps formed due to the multiple gaps formed in a slip type in a horizontal direction (100% of the gap matches the step). Therefore, it is found that the contrast of the liquid crystal display device is improved by about 5 to 15% compared with a case where the formation position of the gap 319a between the scanning electrodes 319 does not match the formation position of the step at all, as shown in FIG. 6(b).

In addition, a case where the formation position of the gap entirely matches the formation position of the step means that the formation area of the gap between the adjacent electrodes are substantially same as the formation area of the step, which is typically 80% or more. Further, a case where the formation area of the gap partially matches the formation position of the step means that the formation area of the step occupying the formation area of the gap is 80% or less, and typically 20 to 80%.

Figure 7A:
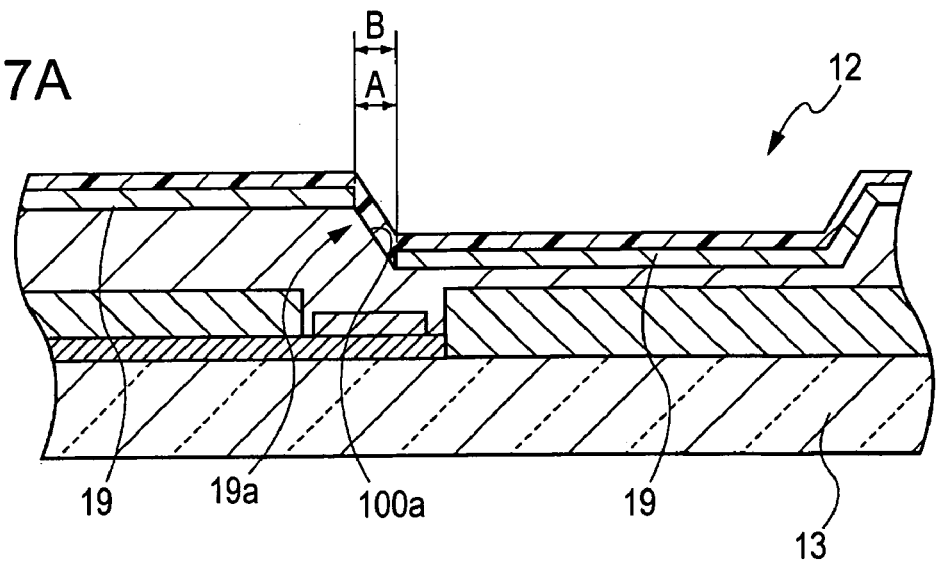
FIGS. 7(a) to 7(c) are diagrams for illustrating a relation between the width of a step and the width of a gap between wiring patterns.

In addition, when the formation position of the predetermined step and the formation position of the gap between the wiring patterns are matched, the width of the step 100 indicated by A may be the same as the width of the gap 19a between the adjacent wiring patterns (scanning electrodes) indicated by B, as shown in FIG. 7(a).

With the width of the step identical to the width of the gap between the adjacent wiring patterns, the wiring patterns may not exist in the step so that the alignment defect or defect noticeability of the liquid crystal material can be reduced. In addition, the gap between the wiring patterns can be prevented from being excessively large, and a reduction in the effective pixel area can be prevented.

Therefore, the liquid crystal display device having an excellent contrast and capable of displaying bright images can be provided.

Figure 7B:
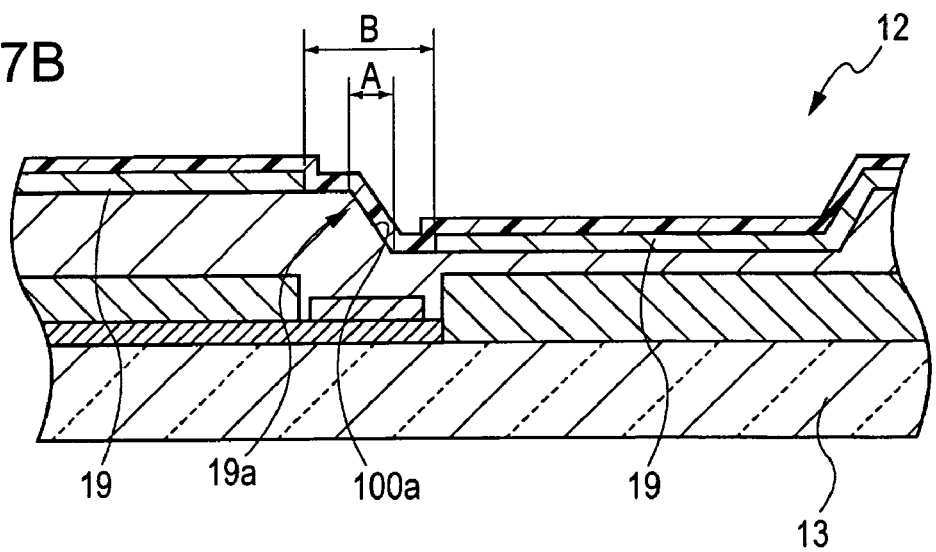

In addition, when the formation position of the predetermined step and the formation position of the gap between the adjacent wiring patterns are matched, the width of the gap 19a between the adjacent wiring patterns (scanning electrodes) indicated by B may be larger than the width of the step 100 indicated by A, as shown in FIG. 7(b). In other words, for example, when there exists a slope portion in the step 100a, the width A of the step 100a is smaller than the width B of the gap 19a such that the slope portion, as well as a flat portion positioned in the upper and lower directions, matches the formation position of the gap 19a between the adjacent wiring patterns 19.

Therefore, with the above relation between the width of the gap and the width of the step, the formation position of the step can match the formation position of the gap. Accordingly, with the gap described above, it is ensured that the alignment defect or the defect noticeability of the liquid crystal material in the pixel can be reduced.

Thus, when the width of the alignment defect of the liquid crystal material is formed in a line shape, considering the width may be larger than the width of the step by 0.5 to 1 µm, the width of the step is preferably formed smaller than the width of the gap between the wiring patterns by at least 1 to 2 µm, and more preferably, by about 2.5 to 3 µm.

Figure 7C:
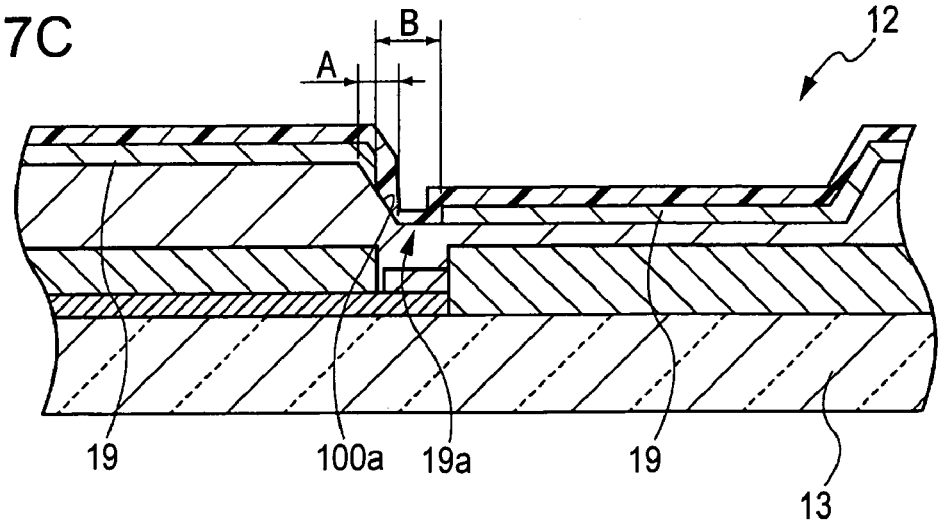

On the contrary, the value A may be larger than the value B, as shown in FIG. 7(c). In other words, for example, when there exists a slope portion in the step 100a, the width B of the gap 19a between the wiring patterns (scanning electrodes) 19 is preferably smaller than the width A of the step 100a such that the scanning electrode 19 exists in the middle of the slope portion.

By doing so, for the pixel where the formation position of the step and the formation position of the gap are matched, the alignment defect of the liquid crystal material can be prevented, and the gap between the wiring patterns can be prevented from being excessively increased. Accordingly, the effective pixel area can be prevented from being reduced.

Further, the width of the step refers to a distance of the region formed by the upper edge and the lower edge of the step when the pair of substrates is seen in the vertical direction. For example, when a slope portion exists in the step, it corresponds to the horizontal width when the slope portion is seen in the vertical direction. Further, when the step is formed in the vertical direction, the width of the step is approximately zero.

When the formation position of the step and the formation position of the gap between the adjacent wiring patterns are matched, the width of the gap B is preferably 1 to 50 µm.

With the above range of the width of the gap, the alignment defect and the defect noticeability due to the predetermined step can be effectively reduced. In addition, with the above width of the gap, the insulating resistance between the adjacent wiring patterns can be easily controlled up to the predetermined value. In other words, for the adjacent wiring patterns, short circuiting and crosstalk should be prevented. However, with the width of the gap in the above wiring pattern, the above-mentioned problems can be effectively avoided.

In addition, when the scanning electrode and the scroll lines on the second substrate are electrically connected using conductive particles mixed into the sealant, considering that the diameter of the conductive particles contained in the sealant is typically about 10 µm, the width of the gap between the adjacent scanning electrodes is preferably 25 to 50 µm. Further, when a small amount of the conductive particles is used or the conductive particles are not used, the width of the gap between the adjacent scanning electrodes is preferably 1 to 10 µm to prevent the reduction of the effective pixel area.

5. Step Portion

Next, a detailed example of the step formed on the substrate of the liquid crystal display device will be described. FIG. 5 is an enlarged diagram of a portion indicated by X in FIG. 2 (corresponding to the XX cross section of FIG. 3 seen from the arrow direction). In addition, FIGS. 8, 11, and 12 are enlarged cross sectional views of the first substrate 12, showing a part corresponding to portion Y, though not specifically shown in FIG. 2. Moreover, FIGS. 9 and 10 are enlarged cross sections of the liquid crystal display, showing a part corresponding to portion X, though not specifically shown in FIG. 2.

In addition, in the drawings, the same elements are represented by the same reference numerals, and the detailed description thereof will be omitted.

(1) Step Due to Multiple Gaps

A step arranged in the cell corresponds to the step 100a due to multiple gaps for adjusting the retardation of the liquid crystal material 232 as shown in FIG. 5. In other words, in the method of forming multiple gaps where the thickness of the liquid crystal layer in the reflection region is thinner than the thickness of the liquid crystal layer, a protective layer 215 may be used as an overcoat on the colored layer 16. More specifically, while forming a reflection layer 212 corresponding to the reflection region, the colored layer 16 corresponding to any one of R, G, and B is formed in the corresponding reflection layer 212 and the transmission region. Next, the protective layer 215 is formed such that the thickness of the layer in the reflection region is thicker than the thickness of the layer in the transmission region. Next, the scanning electrodes 19 are arranged on the protective layer 215 such that the gaps between electrodes match the step 100f of the protective layer 215, and are formed across the reflection region and the transmission region. In addition, an alignment layer 217 is formed overall of the scanning electrodes 19, so that the thickness of the layer of the liquid crystal material in the reflection region can be formed thinner than the thickness of the layer in the transmission region.

Here, since the step due to the multiple gaps formed at the boundary between the transmission region and the reflection region and the gap between the adjacent scanning electrodes are matched, the alignment defect or the defect noticeability due to the step can be reduced.

Therefore, according to the present invention, a liquid crystal display device that adjusts the retardation due to the multiple gaps and having an excellent contrast can be provided.

When the multiple gaps are provided using an interlayer insulating layer, the present invention is not limited to the liquid crystal display device using the TFD devices, and the liquid crystal display device using TFT devices described below may also be used. In addition, in the multiple gaps shown in FIG. 5, the thickness of the liquid crystal material layer 232 in the reflection region and the thickness of the liquid crystal material layer 232 in the transmission layer are adjusted by the transparent resin layer 215 arranged on the first substrate 12. However, the present invention is not limited to the adjustment by the transparent resin layer 215: the multiple gaps may be formed by adjusting the thickness of the interlayer insulating layer or the reflective scattering layer arranged on the second substrate 14, as described below.

(2) Step Due to Light Shielding Layer

Figure 8A:
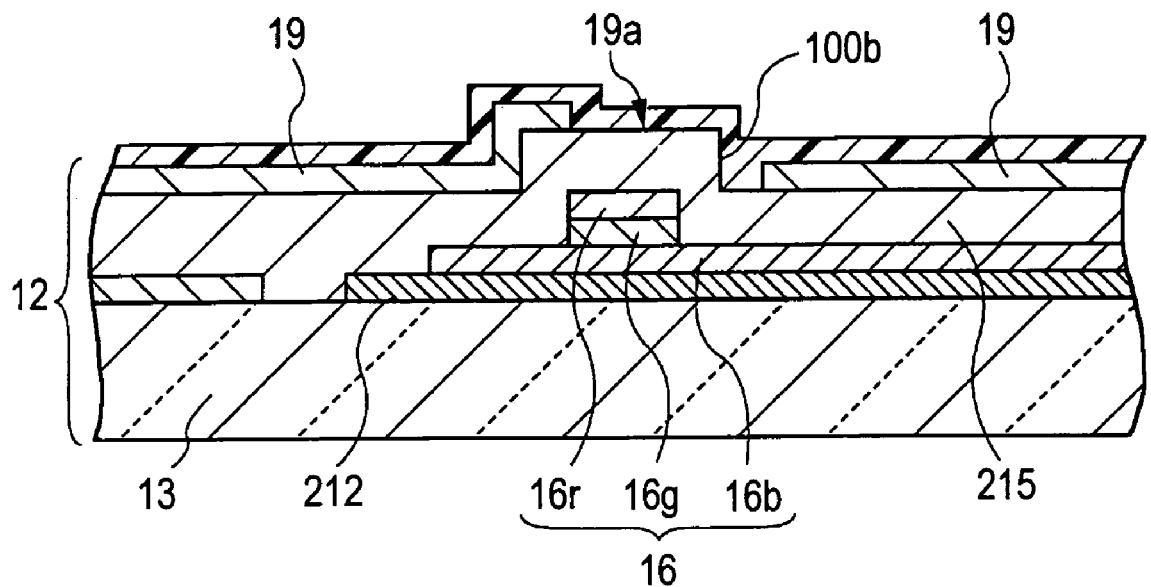
FIG. 8 is a diagram for illustrating a step formed due to a light shielding layer.

In addition, a step arranged in the cell may be a step 100b due to the light shielding layer (in a black matrix), as shown in FIG. 8(a). In other words, FIG. 8(a) shows an example where the formation position of the step 100b formed by the light shielding layer 18 and the formation position of the gap 19a between the adjacent scanning electrodes 19 are matched.

More specifically, the light shielding layer 18 is arranged between the adjacent pixels to prevent a mixed colored component of light. In addition, to reduce the number of processes, the light shielding layer 18 may be formed by repeatedly depositing respective layers when the colored layers 16R, 16G, and 16B corresponding to RGB are formed. Likewise, when the light shielding layer 18 is formed in an overlapping manner, the height thereof becomes higher than other colored layers. Thus, the step 100b is formed at the end. With this arrangement, the formation position of the step 100b due to the light shielding layer 18 matches the formation position of the gap 19a between the adjacent scanning electrodes, so that alignment defects or the defect noticeability due to the step 100b can be reduced.

Figure 8B:
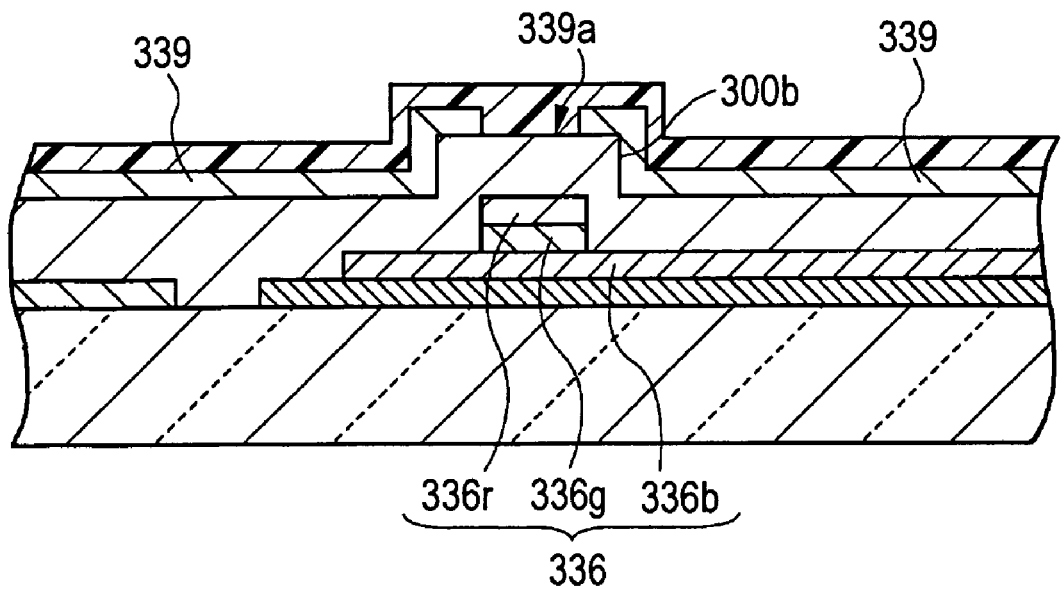

On the contrary, as shown in FIG. 8(b), in the case where the formation position of the step 300b due to the light shielding layer 338 arranged in an overlapping manner and the formation position of the gap 339a between the adjacent scanning electrodes 339 are not matched at all, it will be appreciated that the alignment defects or the defect noticeability in the pixel is not reduced.

Therefore, according to the present invention, with the arrangement shown in FIG. 8(a), a liquid crystal display device having an excellent contrast, as well as preventing mixed color due to the light shielding layer 18, can be provided.

(3) Step Due to Alignment Protrusion

Figure 9A:
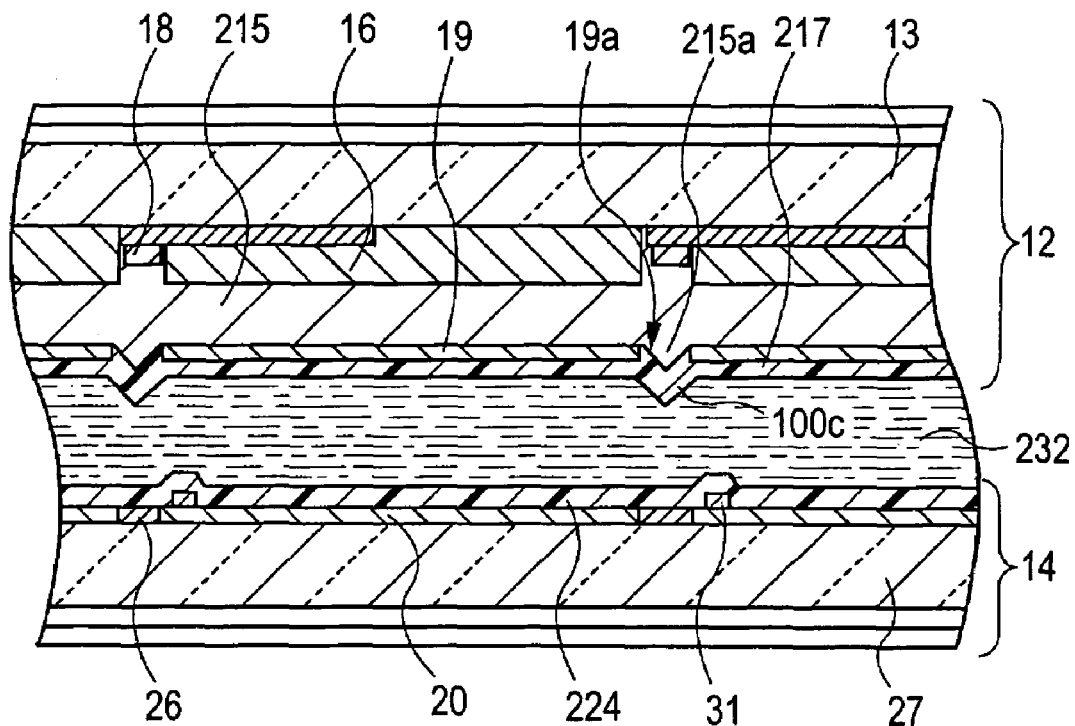
FIG. 9 is a diagram for illustrating a step formed due to an alignment protrusion.
Figure 10:
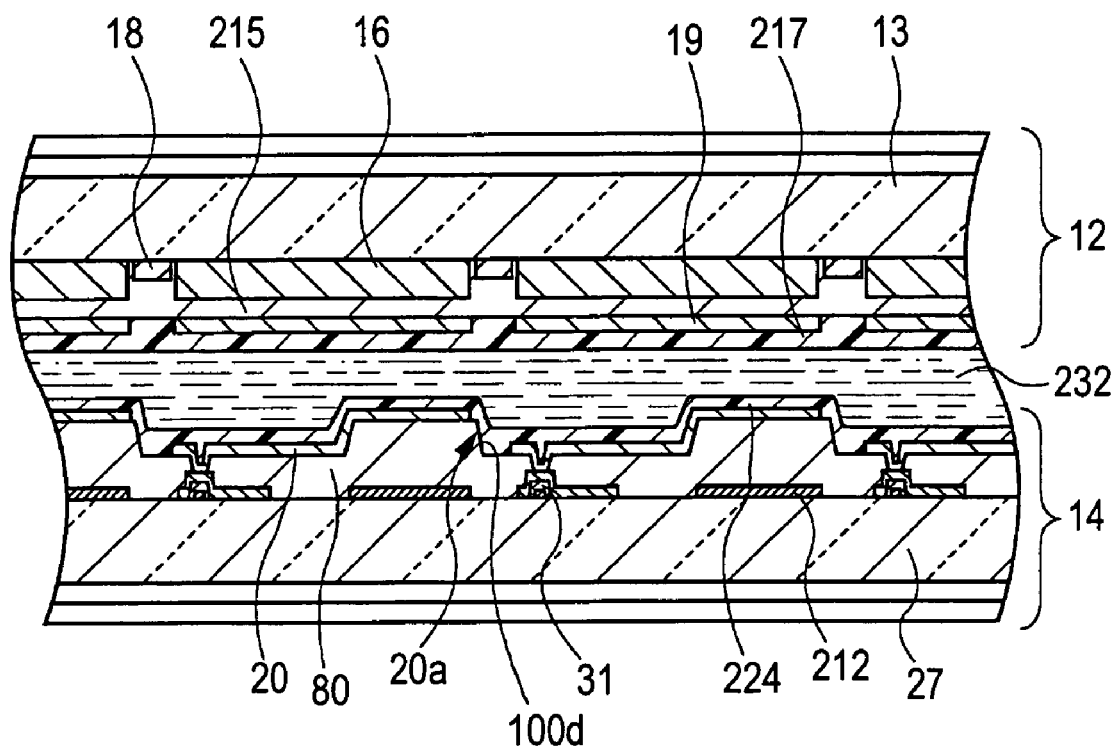
FIG. 10 is a diagram for illustrating a step formed due to an interlayer insulating layer.

In addition, the step arranged in the cell may correspond to a step due to an alignment protrusion for alignment control of the liquid crystal material, as shown in FIG. 9(a). In other words, FIG. 9(a) shows an example where the formation position of the step 100c due to the alignment protrusion 215a matches the formation position of the gap 19a between the adjacent scanning electrodes 19.

More specifically, while the alignment of the liquid crystal material is largely controlled by the alignment layer, an alignment protrusion having a triangular pyramid cross section may be arranged on the surface of the alignment layer to enhance the alignment. Since the alignment protrusion has a predetermined height, a step is provided due to the alignment protrusion. In this case, when the formation position of the step formed due to the alignment protrusion matches the formation position of the gap between the adjacent scanning electrodes, the alignment defects or the defect noticeability due to the step can be reduced.

Figure 9B:
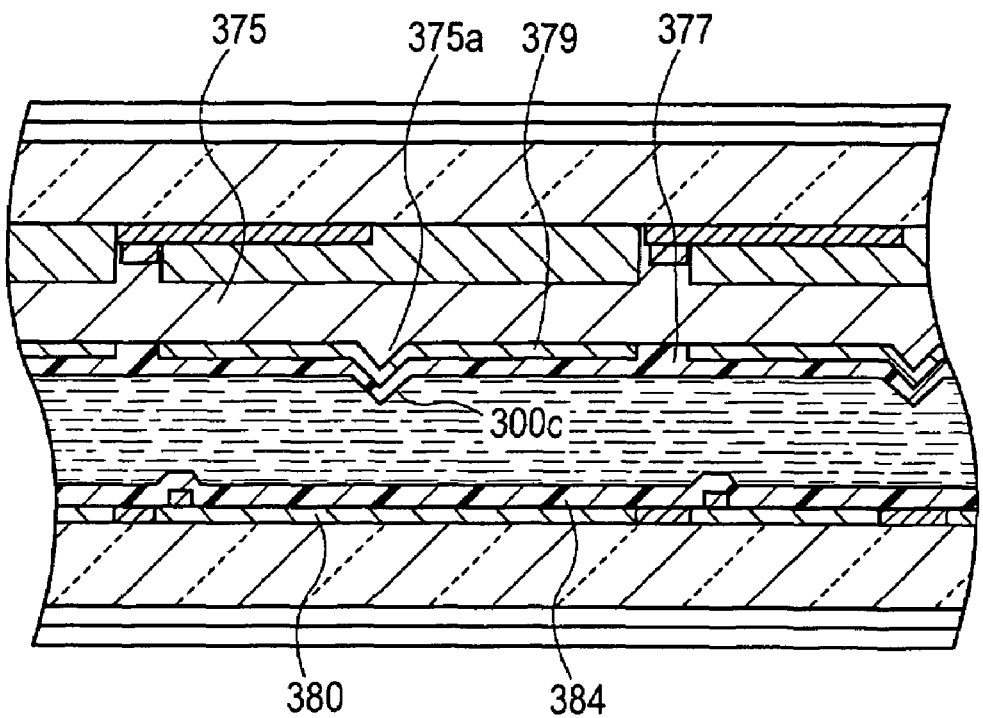

On the contrary, when the formation position of the step 300c due to the alignment protrusion 375a for alignment control and the formation position of the gap between the adjacent scanning electrodes 379 or pixel electrodes 380 are not matched at all, as shown in FIG. 9(b), the alignment defects or the defect noticeability in the pixel cannot not be reduced.

Therefore, according to the arrangement shown in FIG. 9(a) of the present invention, a liquid crystal display device with an improved alignment of the liquid crystal material 232 due to the alignment protrusion 215a for alignment control and an excellent contrast can be provided.

(4) Step Due to Interlayer Insulating Layer

In addition, the step arranged in the cell may be a step 100d due to an interlayer insulating layer 80, as shown in FIG. 10. In other words, as. a method of forming multiple gaps where the total thickness of the liquid crystal material in the reflection region is smaller than the total thickness of the liquid crystal material in the transmission region, the interlayer insulating layer 80 arranged between the data line 26 and the pixel electrode 20 may be formed on the device substrate 14 to prevent crosstalk between the data line 26 and the pixel electrode 20. More specifically, the interlayer insulating layer 80 is formed such that the total thickness of the reflection region where the reflection layer 212 exists is larger than the total thickness of the transmission region, and then, the pixel electrode 20 is arranged on the interlayer insulating layer 80 across the reflection region and the transmission region such that the gap between the electrodes matches the step 100d of the interlayer insulating layer 80. The alignment layer 224 is formed thereon over the entire surface, so that the total thickness of the liquid crystal material in the reflection region can be smaller than that in transmission region.

Here, since the formation position of the step 100d formed due to the interlayer insulating layer 80 and the formation position of the gap 20a between the adjacent pixel electrodes 20 are matched, the alignment defects or the defect noticeability due to the step 100d can be reduced.

Therefore, according to the arrangement shown in FIG. 10 of the present invention, along with the improvement of the electrical insulating and mechanical characteristics and the optimization of the retardation due to the interlayer insulating layer 80, a liquid crystal display device having an excellent contrast can be provided.

Further, the present invention is not limited to the liquid crystal display device using the TFD devices with multiple gaps in the interlayer insulating layer described above: a liquid crystal display device using TFT devices may be used.

(5) Step Due to Photo Spacer

Figure 11A:
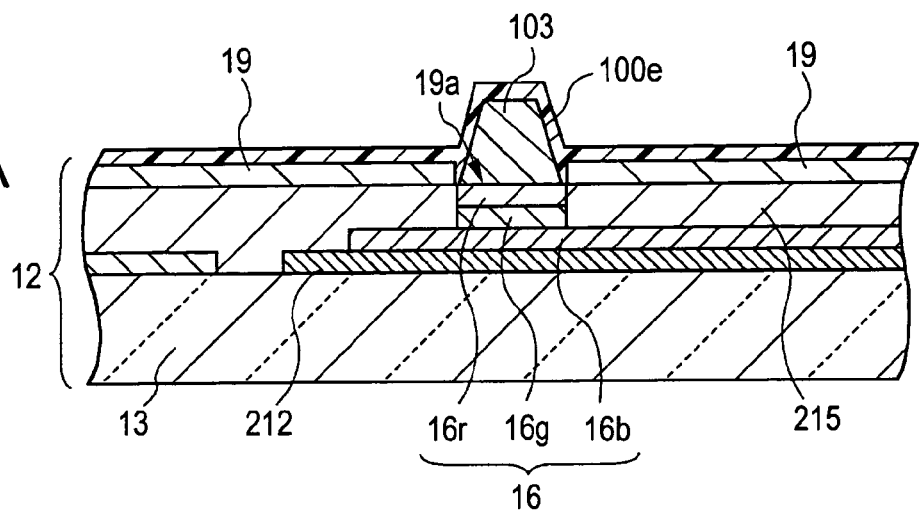
FIG. 11 is a diagram for illustrating a step formed due to a photo spacer.
Figure 12:
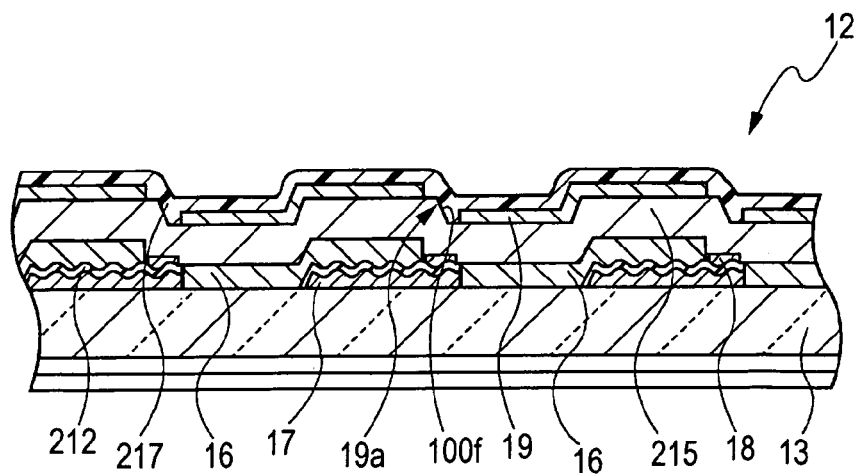
FIG. 12 is a diagram for illustrating a step formed due to a reflective scattering layer.

In addition, the step arranged in the cell may correspond to a step 100e due to a photo spacer 103, as shown in FIG. 11(a). In other words, FIG. 11(a) shows an example where the formation position of the step 100e due to the photo spacer 103 matches the formation position of the gap 19a between the adjacent scanning electrodes 19.

More specifically, a spacer is typically arranged to reduce the variation of the image display by making a uniform thickness in the cell or a photo spacer 103 made of photosensitive material may be arranged to improve the alignment accuracy or the manufacturing process. The photo spacer 103 has a predetermined height, so that the step 100e is generated. In this case, since the formation position of the step 100e formed due to the photo spacer 103 and the formation position of the gap 19a between the adjacent scanning electrodes 19 are matched, the alignment defects or the defect noticeability due to the step 100e can be reduced.

Figure 11B:
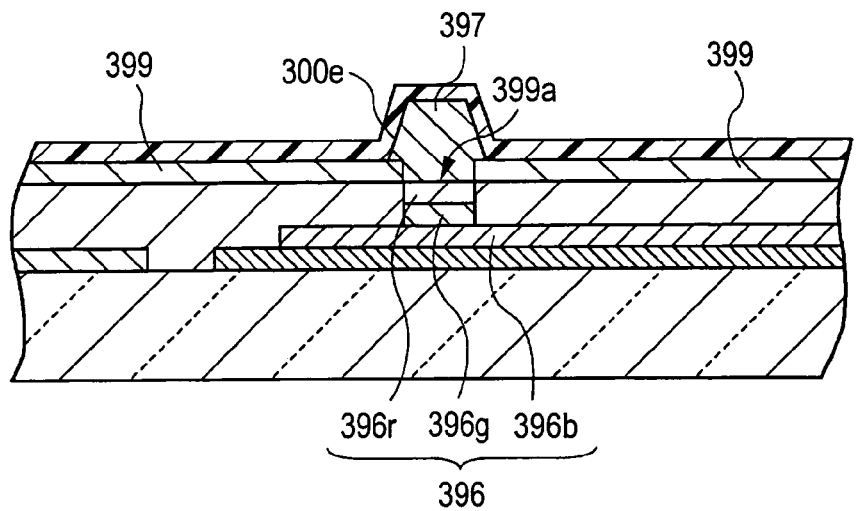

On the contrary, as shown in FIG. 11(b), when the formation position of the step 300e due to a photo spacer 397 and the formation position of the gap between the adjacent scanning electrodes 399 are not matched at all, the alignment defects or the defect noticeability in the pixel is not reduced.

Therefore, according to the present invention, as shown in FIG. 11(a), all of the photo spacers 103 formed on the substrate are formed to match the formation position of the gap 19a between the adjacent pixel electrodes 19, so that a liquid crystal display device with a reduced variation of the image display and an excellent contrast due to the photo spacer 103 can be provided.

(6) Step Due to Reflective Scattering Layer

In addition, the step arranged in the cell may correspond to a step 100f due to a reflective scattering layer 17, as shown in FIG. 12. In other words, as a method of forming multiple gaps where the total thickness of the liquid crystal layer in the reflection region is smaller than that in the transmission region, the reflective scattering layer 17 may be used to prevent the effect of specular reflection of the reflection layer 212 arranged in the reflection region. More specifically, a reflection layer 212 is further formed on the reflective scattering layer 17 formed in advance in the reflection region. Next, the colored layer 16 corresponding to any one of R, G, and B components is formed on the reflection layer 212 and in the transmission region. In addition, after forming the protective layer 215 on the colored layer 16 as an overcoat, the scanning electrodes 19 are formed on the protective layer 215 across the reflection region and the transmission region such that the gap between the electrodes matches the step 100f of the reflective scattering layer 17. In addition, with the alignment layer 217 formed on the scanning electrodes 19, the total thickness of the liquid crystal layer in the reflection region can be smaller than that in the transmission region.

Here, since the formation position of the step 100f due to the reflective scattering layer 17 and the formation position of the gap 19a between the adjacent scanning electrodes 19 are matched, the alignment defects or the defect noticeability due to the step provided by the reflective scattering layer can be reduced.

Therefore, according to the present invention shown in FIG. 12, a liquid crystal display device preventing a slope reflection by the reflective scattering layer 17 and having an optimized retardation, as well as an excellent contrast, can be provided.

Further, the present invention is not limited to the liquid crystal display device using the TFD devices as multiple gaps in the interlayer insulating layer described above, but the liquid crystal display device using TFT devices may be used. In this case, the gap between the electrodes matching the step is a gap between the pixel electrodes on the device substrate.

(7) Step Shape

In addition, for example, a slope portion 100a arranged in the cell or a taper may be arranged.

This is because by forming the gap between the adjacent scanning electrodes the gap can be formed with high accuracy. In other words, when the step is a vertical wall without the slope portion, it is difficult to form a resist for forming the gap between the adjacent scanning electrodes with high accuracy and excellent adhesiveness. As a result, it is difficult to form a gap with high accuracy. In addition, even when the scanning electrodes and the like are formed on part of the step, disconnection can be prevented with the above-mentioned step.

Therefore, with the step having the slope portion, the formation position of the gap between the adjacent scanning electrodes and the formation position of the step can be accurately matched. Accordingly, the alignment defects or the defect noticeability in the pixel can be reduced.

In addition, the slope portion of the step is preferably formed with an angle of 45 to 85°, and more preferably, 50 to 80°.

6. Manufacturing Method

A method of manufacturing the liquid crystal display device of the first embodiment will be described in detail with reference to FIGS. 13 to 15, in the context of the active matrix liquid crystal display device having TFD devices.

(1) Manufacturing the First Substrate (1)-1 Formation of Color Filter

Figure 13A:
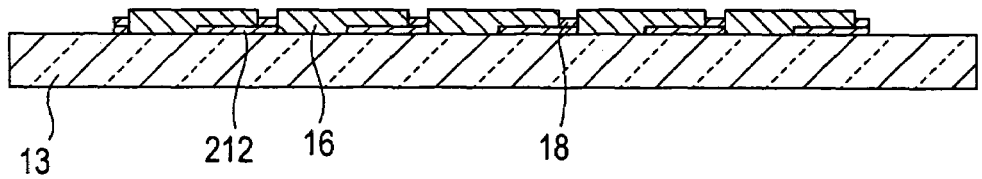
FIGS. 13(a) to 13(f) are cross sectional views showing a manufacturing process for forming a first substrate.

As shown in FIG. 13(a), a reflection layer 212 having a reflecting portion 212b and an opening as a transmission part 212a, a colored layer 16, and a light shielding layer 18 are preferably formed one after another on the place corresponding to the image display region. In other. words, with the reflection layer 212, a transflective liquid crystal display device having a transmission region and a reflection region to display in a transmission mode and a reflection mode may be provided.

Here, the reflection layer 212 having the opening therein is formed by forming metal material on the second glass substrate 13 through deposition or sputtering, followed by patterning of the metal material using photolithography and etching.

Next, for example, a photosensitive resin having coloring material such as pigment or dye dispersed therein is preferably deposited, patterned by exposure, and developed to form a color filter 214. In other words, the color filter 214 can be formed with a plurality of the colored layers 16 and the light shielding layers 18.

In addition, a plurality of the colored layers 16 (16r, 16g, and 16b) can be overlapped, or alternatively, a black material such as carbon can be used to form the light shielding layer 18.

In addition, to display color images, in the case where the colored layer 16 (16r, 16g, and 16b) having a plurality of color components is arranged to form a color filter, the same process is repeated for each color.

(1)-2 Formation of Protective Layer

Figure 13B:
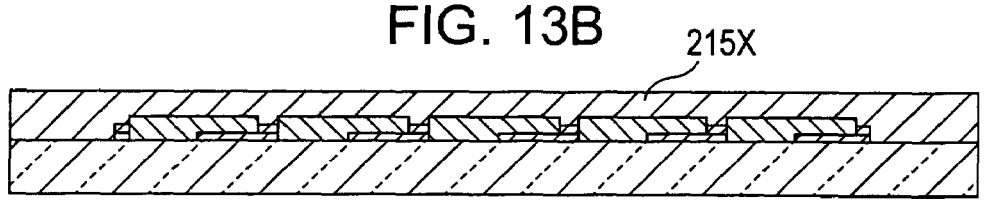

Next, a surface protective layer 215 is preferably formed as shown in FIG. 13(b).

In other words, a photosensitive resin 215X is deposited over the entire color filter substrate 12. The photosensitive resin 215X may be, for example, acrylic resin, epoxy resin, imide resin, and fluoric resin. The resin is deposited on the substrate in a fluid, non-hardened state, and the deposition may employ spin coating or printing.

Figure 13C:
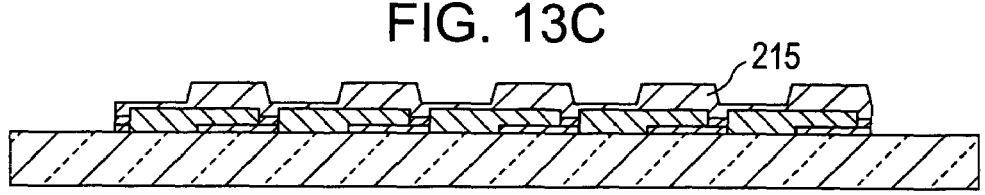

Next, as shown in FIG. 13(c), the deposited photosensitive resin 215X is patterned using photolithography and etching to form the surface protective layer 215. In other words, the surface protective layer 215 having a predetermined pattern can be formed on the colored layer 16 (16r, 16g, and 16b) having a plurality of color components through drying, light curing, or heat curing processes.

(1)-3 Forming First Wiring Patterns (Scanning Electrodes)

Figure 13D:
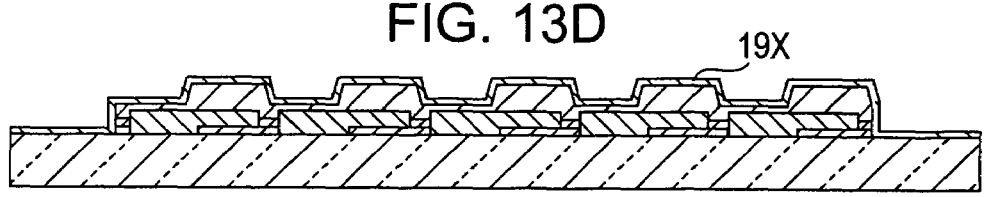
Figure 13E:
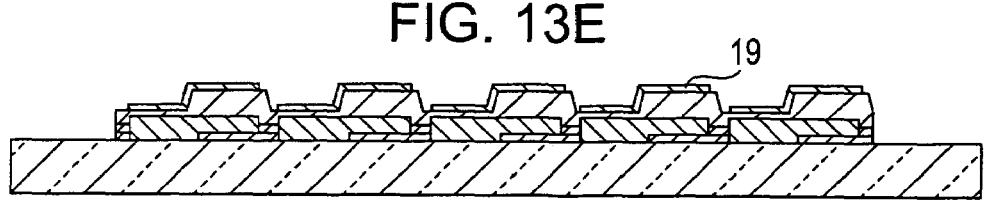

Next, as shown in FIG. 13(d), a transparent conductive layer 19X made of a transparent conductive layer material such as ITO (Indium Tin oxide) is preferably formed over the entire protective layer 215. The transparent conductive layer 19X may be formed through sputtering, for example. Further, the transparent conductive layer 19X is patterned using photolithography to form the scanning electrodes 19, as shown in FIG. 13(e).

Figure 13F:
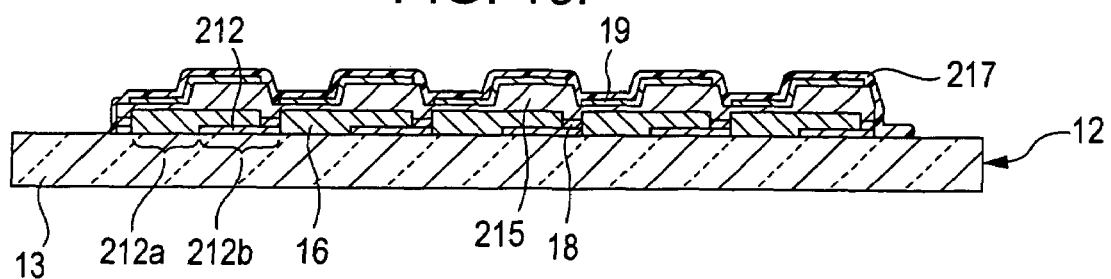

Next, as shown in FIG. 13(f), a first alignment layer 217 made. of polyimide resin is formed on the substrate where the scanning electrodes 19 are formed, so that the first substrate 12 can be provided.

(2) Manufacturing Second Substrate

A method of manufacturing the second substrate 14 will be described with reference to FIGS. 14 to 15, in the context of active devices (TFD devices).

Figure 14A:
FIGS. 14(a) to 14(d) are cross sectional views showing a manufacturing process for forming a second substrate.

First, as shown in FIG. 14(a), a conductive metal layer material 32' is deposited over the entire glass substrate 27 through sputtering. Here, although not shown, an insulating layer made of tantalum oxide ($Ta_2O_5$) may be formed on the second glass substrate 27 to improve adhesiveness between the glass'substrate and the metal layer material.

Figure 14B:
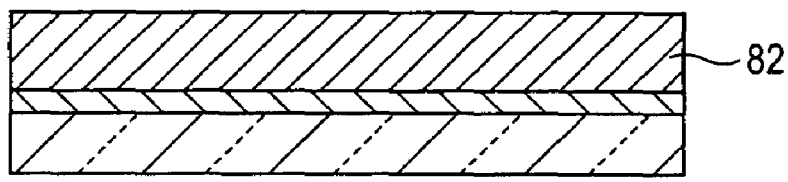
Figure 14C:
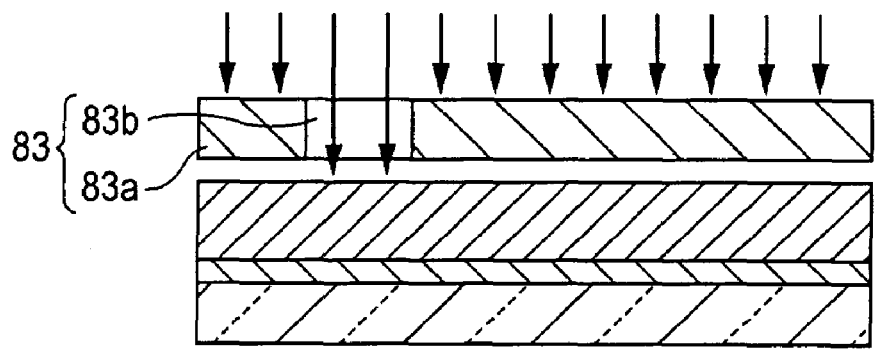
Figure 14D:
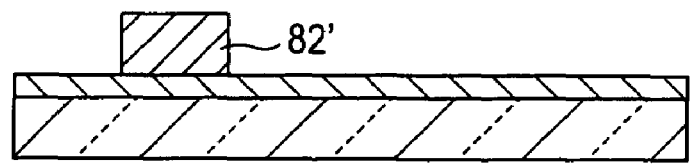

Next, as shown in FIG. 14(b), a resist material 82 is deposited over the entire surface. Next, as shown in FIG. 14(c), light is illuminated only on the position corresponding to, for example, an opening 83b, via a photomask 83 having an opening 83b to expose the pattern, and perform a development process so that the resist 82' is left only on the place corresponding to the opening 83b of the photomask, as shown in FIG. 14(d).

Figure 15A:
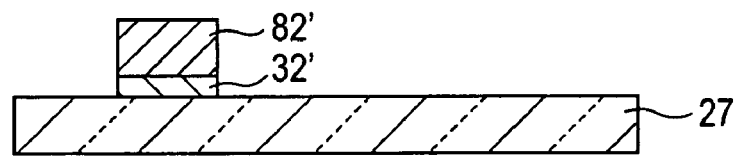
FIGS. 15(a) to 15(e) are cross sectional views showing a continued manufacturing process for forming a second substrate.
Figure 15B:
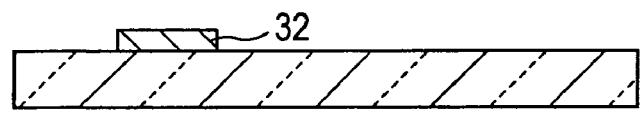

Next, as shown in FIG. 15(a), the conductive. metal layer material 32' arranged at a place not covered with the resist 82' is removed through etching, and then, the resist 82' is removed to form the patterned first metal layer 32, as shown in FIG. 15(b).

Figure 15C:
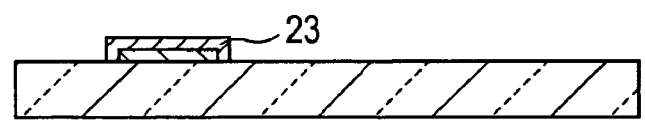

Next, as shown in FIG. 15(c), an oxide layer 23 is formed by oxidizing a surface of the first metal layer 32 through an anodic oxidation method. More specifically, the glass substrate 27 where the first metal layer 32 is formed is dipped into an electrolyte such as citric acid solution, and a predetermined voltage is applied between the electrolyte and the first metal layer 32 to oxidize the surface of the first metal layer 32. In addition, the thickness of the oxide layer 23 may be appropriately changed, but is preferably 10 to 50 nm.

Figure 15D:
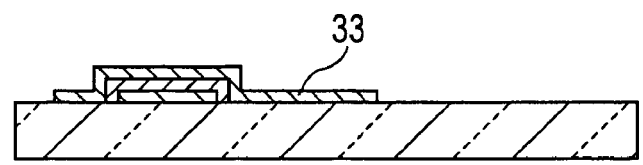

Next, as shown in FIG. 15(d), a patterned second metal layer 33 is formed on the first metal layer 32 having the oxide layer 23. Further, although not shown, until now when the first metal layer 32, the second metal layer 33, and the like are formed, they are preferably deposited one after another to simultaneously form the data lines and the scroll lines.

Figure 15E:
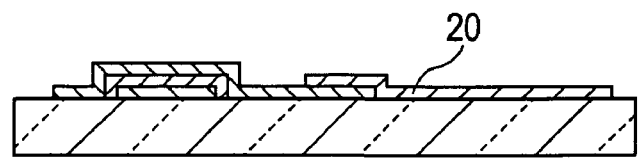

Next, as shown in FIG. 15(e), pixel electrodes 20 are formed as second wiring patterns made of the transparent conductive material to electrically connect the second metal layer 33.

Next, although not shown, a second alignment layer made of polyimide resin and the like is formed on the substrate where the pixel electrode 20 is formed, so that the second substrate 14 can be provided.

(3) Bonding Process

Next, although not shown, a sealant having epoxy resin as a primary component, for example, is patterned on the second substrate to enclose an image display region through screen printing or dispensing.

Here, preferably, the second glass substrate printed with the sealant is pre-baked such that solvent in the sealant is evaporated. In other words, with a temperature condition lower than a sealant curing temperature, the second glass substrate is pre-baked while reducing the pressure. For example, processing is preferably performed with a temperature of 35 to 70° C., and a pressure of 50 to 90 kPa.

Moreover, the first substrate and the second substrate are bonded such that the second substrate having the sealant deposited thereon and the first substrate are superposed and bonded, and then, they are supported while applying heat and pressure to cure the sealant.

Next, a liquid crystal material (liquid crystal) is injected into a space which is enclosed by the first substrate and the second substrate and is placed inside of the sealant, and the space is sealed with a sealing material, so that the a liquid crystal panel can be provided.

Second Embodiment

According to the second embodiment of the present invention, a liquid crystal display device is provided, comprising a pair of substrates including a first substrate having first wiring patterns thereon and a second substrate having second wiring patterns thereon; and a liquid crystal material interposed between the first substrate and the second substrate. Here, a step is formed on the first or second substrate. In addition, a gap, which is an electrical insulating region, is formed between the adjacent first wiring patterns and the adjacent second wiring patterns, corresponding to a formation position of the step having an upper flat portion, a slope portion, and a lower flat portion. In addition, one edge of the gap and the other edge of the gap satisfies one of the following arrangement relations (A) to (D).

(A) One edge of the gap is arranged on the upper flat portion of the step, and the other edge of the gap is arranged on the lower flat portion of the step.

In other words, an end at one side is arranged on the upper flat portion of the step, and an end at the other side is arranged on the lower flat portion. of the step such that both ends of the first wiring pattern and the second wiring pattern do not exist in the slope portion.

(B) One edge of the gap is arranged on an upper part of the slope portion of the step, and the other edge of the gap is arranged on the. lower flat portion of the step.

In other words, of both ends of the adjacent first wiring patterns or the adjacent second wiring patterns, the end at one side is arranged on the slope portion of the step, and an end at the other side is arranged on the lower flat portion.

(C) One edge of the gap is arranged on the upper flat portion of the step, and the other edge of the gap is arranged on a lower part of the slope portion of the step.

In other words, of both ends of the adjacent first wiring patterns or the adjacent second wiring patterns, an end at one side is arranged on the slope portion of the step, and an end at the other side is arranged on the upper flat portion.

(D) One edge of the gap is arranged on an upper part of the slope portion of the step, and the other edge of the gap is arranged on a lower part of the slope portion of the step.

In other words, both ends of the adjacent first wiring patterns or the adjacent second wiring patterns partially match the respective slope portions of the step.

The liquid crystal display device according to the second embodiment of the present invention will now be described in more detail in the context of the liquid crystal display device described in the first embodiment. Further, the positional relation of the step and the edge of the gap between the adjacent wiring patterns will be described herein with reference to the positional relation of the step due to the multiple gaps on the first substrate (color filter substrate) and the edge of the gap between the adjacent scanning electrodes.

In addition, what is different from the first embodiment will be mainly described herein, and the same functions and arrangements as those in the first embodiment, such as the basic construction of the liquid crystal display device, the first substrate, and the second substrate, will be omitted. Here, the cross sectional views shown in FIGS. 16 and 17 represent an enlarged diagram of a portion indicated by X in FIG. 2 (corresponding to the X-X cross section seen from the arrow direction of FIG. 3).

(1) Arrangement (A)

According to the liquid crystal display device of the present embodiment, the predetermined step and the end of the gap between the adjacent wiring patterns are preferably arranged such that an edge 19A is arranged on an upper flat portion 21 of a step 100a and the other edge 19B is arranged on a lower flat portion 22 of the step 100a, and thus each edge 19A and 19B of the gap between the adjacent scanning electrode 19 does not exist in a slope portion 25.

With the above arrangement, since the scanning electrode does not exist in the non-flat slope portion, the alignment defects of the liquid crystal material can be effectively prevented using the corresponding slope portion as a non-field area. Therefore, a liquid crystal display device having an improved contrast of displayed images can be provided.

Figure 17A:
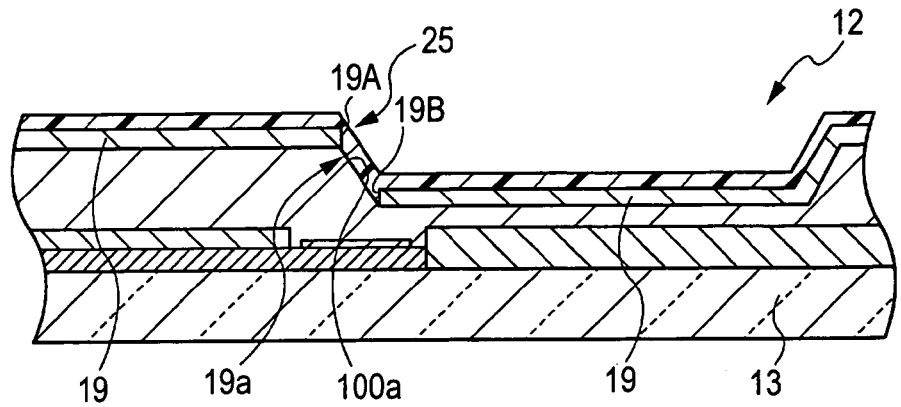
FIGS. 17(a) to 17(c) are diagrams showing an example in which a boundary of a flat portion and a slope portion of the step match an edge of the gap.

In addition, with respect to the arrangement A, the positions of the edges 19A and 19B of the gap between the adjacent scanning electrodes 19 preferably match boundaries between the upper flat portion 21 or the lower flat portion 22 of the step 100a and the slope portion 25, as shown in FIG. 17(a).

With the above arrangement, it is ensured that the alignment defects or the defect noticeability of the liquid crystal material in the slope portion can be reduced, and the gap between the adjacent scanning electrodes can be prevented from being excessively increased. Thus, the reduction of the effective pixel area can be prevented.

Therefore, in a case where the edge at the one side of the gap between the adjacent scanning electrodes is arranged on the upper flat portion of the step and the edge at the other side thereof is arranged on the lower flat portion of the step, preferably, the boundaries between the respective flat portions and the slope portion and the edges of the gap between the adjacent scanning electrodes are perfectly matched. However, even in the other case, the positions of the edges of the gap between the adjacent scanning electrodes are preferably within less than 10 μm from the boundaries, and more preferably within less than 5 μm.

(2) Arrangement (B) and (C)

Figure 16A:
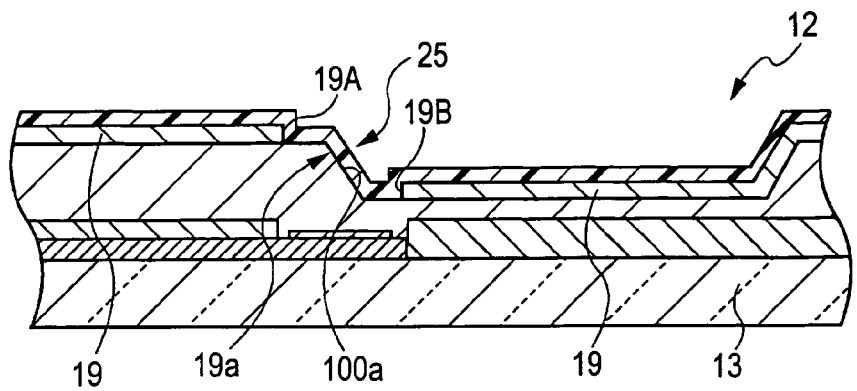
FIGS. 16(a) to 16(d) are schematic cross sectional views showing a first substrate according to the second embodiment of the present invention.
Figure 16B:
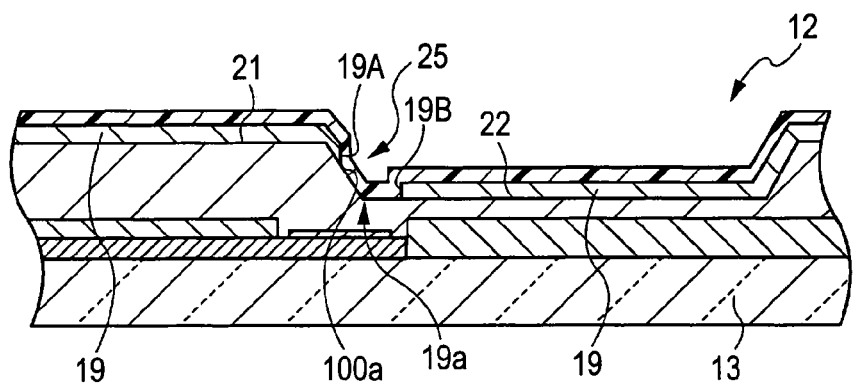
Figure 17B:
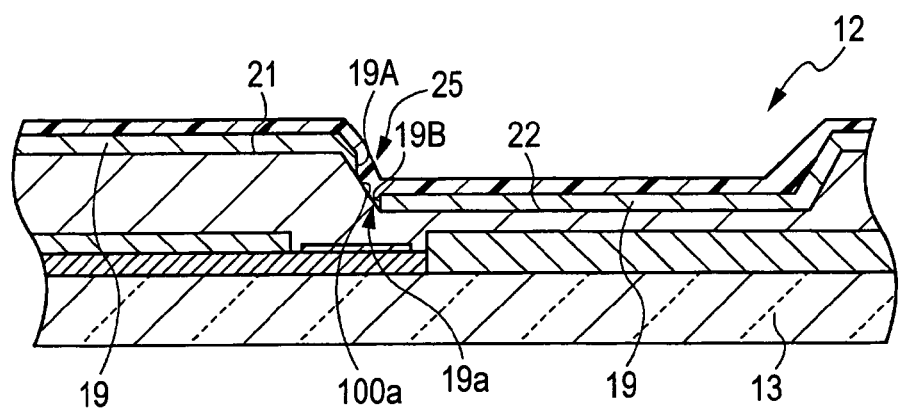
Figure 17C:
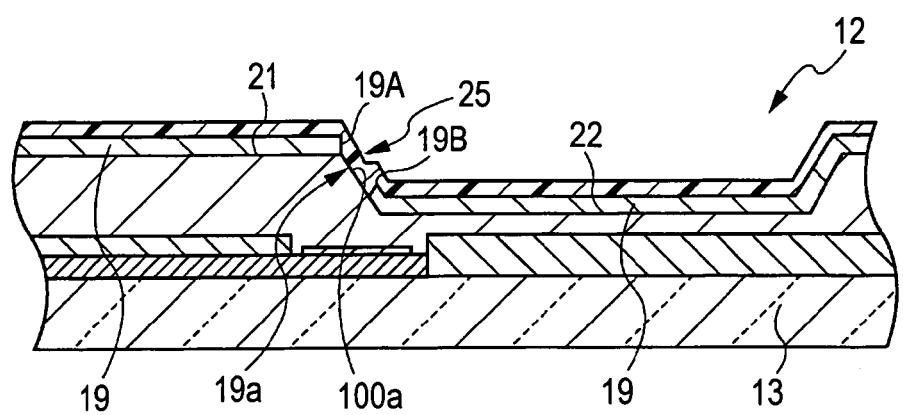

In addition, according to another aspect of the liquid crystal display device of the present embodiment, one edge 19A of the respective edges 19A and 19B of the gap between the adjacent scanning electrodes 19 is preferably extended to the slope portion 25 of the step 100a and the other edge 19B is arranged in the lower flat portion 22 of the step 100a, as shown in FIG. 16(b).

Figure 16C:
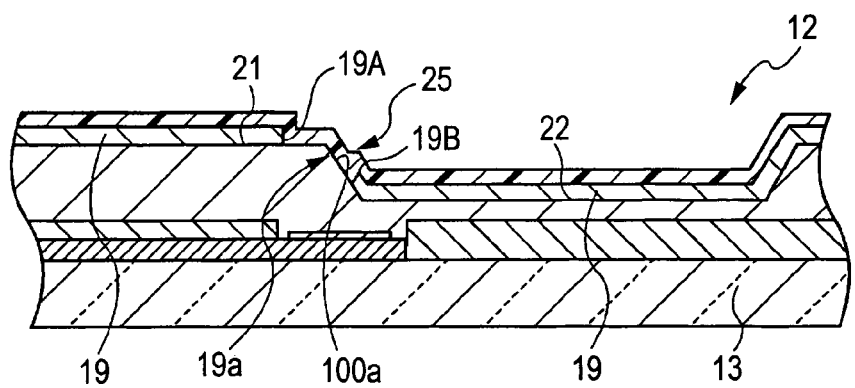

In addition, contrary to the example shown in FIG. 16(b), one edge 19A of the respective edges 19A and 19B of the gap between the adjacent scanning electrodes 19 is preferably arranged in the upper flat portion 21 of the step 100a and the other edge 19B is arranged in the slope portion 25 of the step 100a, as shown in FIG. 16(c).

By arranging the predetermined step and the edge of the gap between the adjacent scanning electrodes to satisfy the above relation, the respective pixel areas can be enlarged, and the alignment defects of the liquid crystal material can be effectively prevented for the step region where the scanning electrode does not exist. In other words, compared to a case where the scanning electrodes partially exist in the step but both edges of the gap between the adjacent scanning electrodes are arranged in the upper flat portion and the lower flat portion, the pixel area can be increased and the alignment defects of the liquid crystal material can be effectively prevented. Therefore, a liquid crystal display with an improved contrast of displayed images and a bright image display can be provided.

Further, with the above-mentioned arrangement, from the aspect that the pixel area is prevented from being excessively reduced, the edges of the gap between the scanning electrodes arranged on the upper flat portion and the lower flat portion of the step match the boundaries of the corresponding float portion and the slope portion, as described above.

(3) Arrangement (D)

Figure 16D:
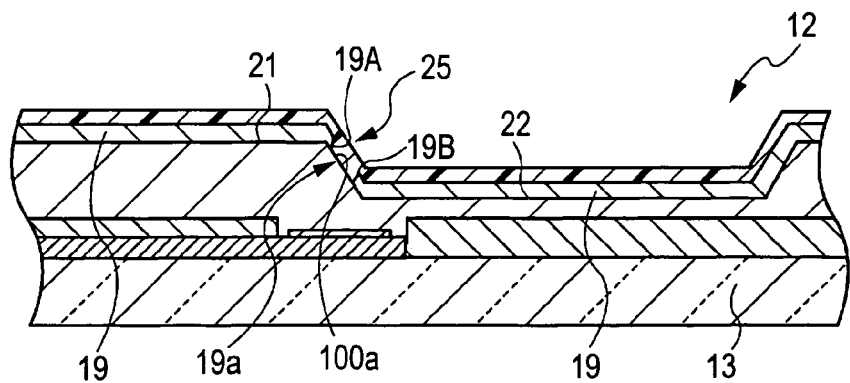

In addition, according to yet another aspect of the present embodiment, preferably, the respective edges 19A and 19B of the gap between the adjacent scanning electrodes 19 are extended to partially overlap the slope portion 25 of the predetermined step 100a, as shown in FIG. 16(d).

According to the arrangement (D), since the scanning electrode does not exist in a part of the slope portion, the alignment defects of the liquid crystal material can be reduced. Further, compared with a case where one of the edges is arranged on the upper flat portion or the lower flat portion of the step, the pixel area can be further enlarged. Therefore, a liquid crystal display with an improved contrast of displayed images and a bright image display can be provided.

Third Embodiment

According to the third embodiment of the present invention, an active matrix liquid crystal display device is provided, comprising a first substrate (element substrate) having pixel electrodes thereon as first wiring patterns; a second substrate (counter substrate) having counter electrodes thereon as second lines patterns; and TFT (thin film transistors) devices, wherein the TFT, devices are 3-terminal switching devices.

Further, in the description of third embodiment the same functions and arrangements as those in the first embodiment will be omitted.

(1) Basic Construction

Figure 18:
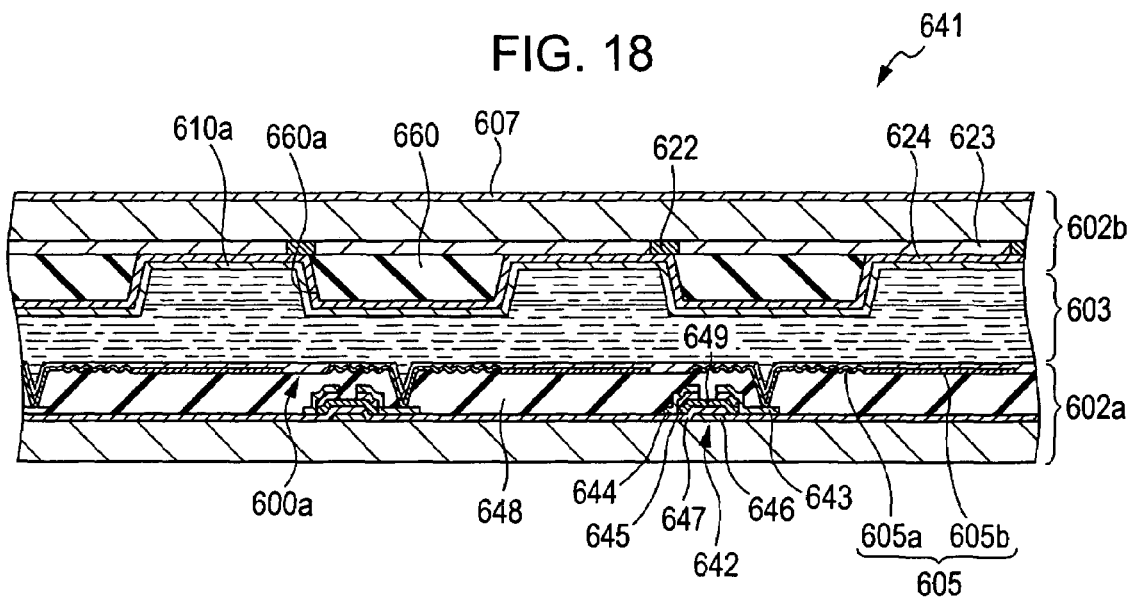
FIG. 18 is a schematic diagram showing a liquid crystal panel according to a third embodiment of the present invention.

First, a liquid crystal display device 641 illustrated in FIG. 18 is provided such that a first substrate 602a and a second substrate 602b are bonded at the peripheries using sealant and a liquid crystal material is sealed into a space formed by the first substrate 602a, the second substrate 602b, and the sealant, i.e. a cell gap, to form a liquid crystal layer 603.

Here, the first substrate 602a comprises TFT (thin film transistor) devices 642 acting as 3-terminal switching devices; pixel electrodes 605 as the first wiring patterns electrically connected to drain electrode; and organic insulating layer 648 interposed between the TFT devices 643 and the pixel electrodes 605. An alignment layer 610a is formed on the pixel electrodes 605, and a rubbing process is performed on the alignment layer 610a. In addition, the pixel electrode 605 is made of a photo-reflective conductive material, such as Al (aluminum) and Ag (silver).

In addition, the second substrate 602b comprises a colored layer 623; counter electrodes 624 formed as second wiring patterns on the colored layer 623; and an alignment layer 610b formed on the counter electrodes 624.

Among these, the counter electrode 624 is a planar electrode formed over the entire second substrate 602b and made of transparent conductive material such as ITO (Indium Tin Oxide). Further, the colored layer 603 comprises a color filter element having any one of color components such as R (red), G (green), and B(blue) or color components such as C (cyan), M (magenta), and Y (yellow), at a position facing the pixel electrodes 605 on the first substrate 602a. To improve the contrast while displaying images, a light shielding layer 622 is arranged at the space in the colored layer 623 not to overlap with the pixel electrode 605 in the perpendicular direction.

(2) TFT Device

Next, an arrangement of the TFT device 642 serving as a 3-terminal switching device will be described with reference to FIG. 19.

The TFT device 642 comprises a gate electrode 646 formed on the first substrate 602a and a gate insulating layer 647 formed on the gate electrode 646 of the entire first substrate 602a. In addition, the TFT device 642 further comprises a semiconductor layer 649 formed on the upper position of the gate electrode 646, having the gate insulating layer 647 interposed therebetween; a source electrode 644 on the one side of the semiconductor layer 649 formed through a contact electrode 645; and a drain electrode 643 formed on the other side of the semiconductor layer 649 through the contact electrode 645.

Figure 19:
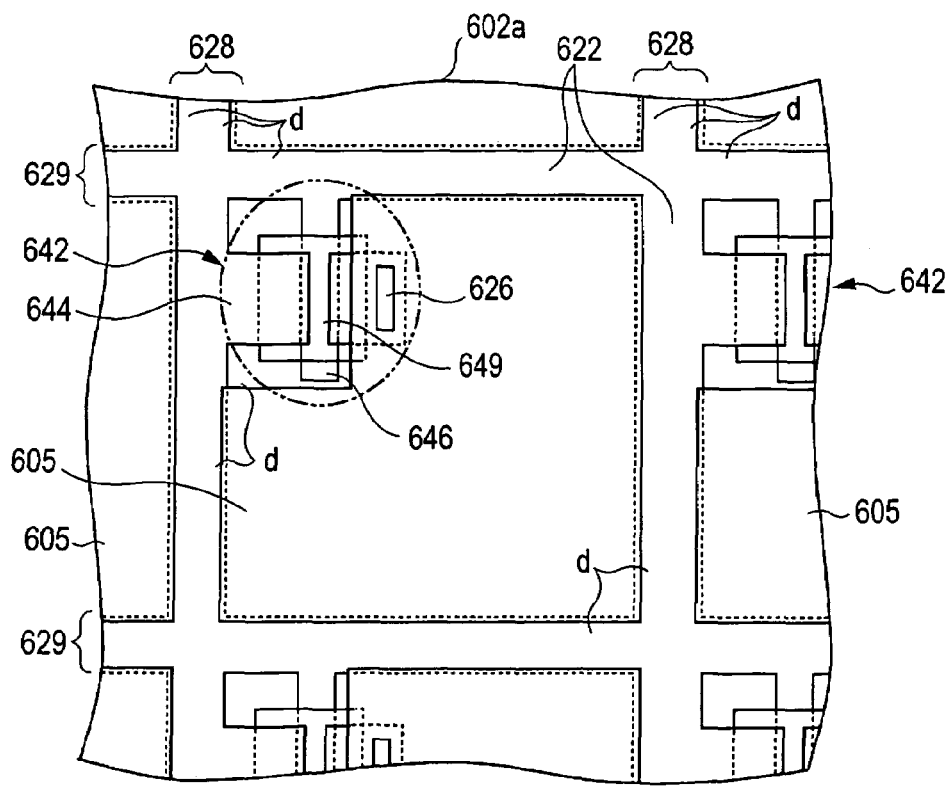
FIG. 19 is a diagram for illustrating an arrangement of a TFT device.

In addition, as shown in FIG. 19, the gate electrode 646 extends from a gate bus line 629, and the source electrode 644 extends from a source bus line 628. The gate bus line 629 describe above extends in a horizontal direction of the first substrate 602a, and there exists a plurality of perpendicular gate bus lines 629 in parallel at regular intervals. In addition, the source bus line 628 extends in the perpendicular direction to intersect the gate bus line 629, with the gate insulating layer 647 therebetween, and there exists a plurality of horizontal source bus lines in parallel at regular intervals.

The gate bus line 629 is connected to a driving semiconductor device (not shown), acting as a scanning line, for example. In addition, the source bus line 628 is connected to another driving semiconductor device (not shown), acting as a signal line, for example.

Further, as shown in FIG. 19, the pixel electrode 605 is formed at a place where the pixel electrode 605 does not overlap the TFT device 642 of the intersected regions by the gate bus lines 629 and the source bus lines 628.

Here, considering the electrical characteristics and resistance to corrosion, the gate bus line 629 and the gate electrode 646 are made of metal such as Cr or Ta, respectively. Further, the gate insulating layer 647 may be made of, for example, $SiN_x$ and $SiO_x$. In addition, the semiconductor layer 649 is made of, for example, doped a-Si, polysilicon, or CdSe, and the contact electrode 645 may be made of a-Si.

Furthermore, the source electrode 644 and the source bus line 628 and the drain electrode 643 integrated therewith may be made of Ti, Mo, and Al, respectively.

In addition, while the organic insulating layer 648 is formed over the entire first substrate 602a to cover the gate bus lines 629, the source bus lines 628 and the TFT devices 642, the contact hole 626 is formed at a place corresponding to the drain electrodes 643. In other words, the pixel electrode 605 and the drain electrode 643 of the TFT device 642 are connected through the contact hole 626.

In other words, with the active matrix liquid crystal display device having TFT devices 642, the voltage is applied between the counter electrodes 624 and the pixel electrodes 605 selected by the scanning signal and the data signal. Therefore, the alignment of the liquid crystal material can be controlled accurately at high speed for each pixel so that an observer can recognize image display such as characters and numbers.

(3) Positional Relation Between Step and Gap

In addition, according to the liquid crystal display device of the third embodiment of the present invention, even when a step exists due to multiple gaps in the cell or the light shielding layer, the formation position of the corresponding step and the formation position of the gap between the adjacent pixel electrodes match. Therefore, the alignment defects or the defect noticeability of the liquid crystal material due to the step is effectively reduced, and thus, a liquid crystal display device having an excellent contrast can be provided.

In other words, as in the second embodiment, one edge of the gap and the other edge of the gap satisfies one of the following arrangement relations (A) to (D), thereby providing a liquid crystal display device having an excellent contrast.

(A) One edge of the gap is arranged on the upper flat portion of the step, and the other edge of the gap is arranged on the lower flat portion of the step.

(B) One edge of the gap is arranged on an upper part of the slope portion of the step, and the other edge of the gap is arranged on the lower flat portion of the step.

(C) One edge of the gap is arranged on the upper flat portion of the step, and the other edge of the gap is arranged on a lower part of the slope portion of the step.

(D) One edge of the gap is arranged on an upper part of the slope portion of the step, and the other edge of the gap is arranged on a lower part of the slope portion of the step.

Fourth Embodiment

As a fourth embodiment of the present invention, an electronic apparatus having the liquid crystal display device of the first embodiment will be described in detail with reference to FIG. 20.

Figure 20:
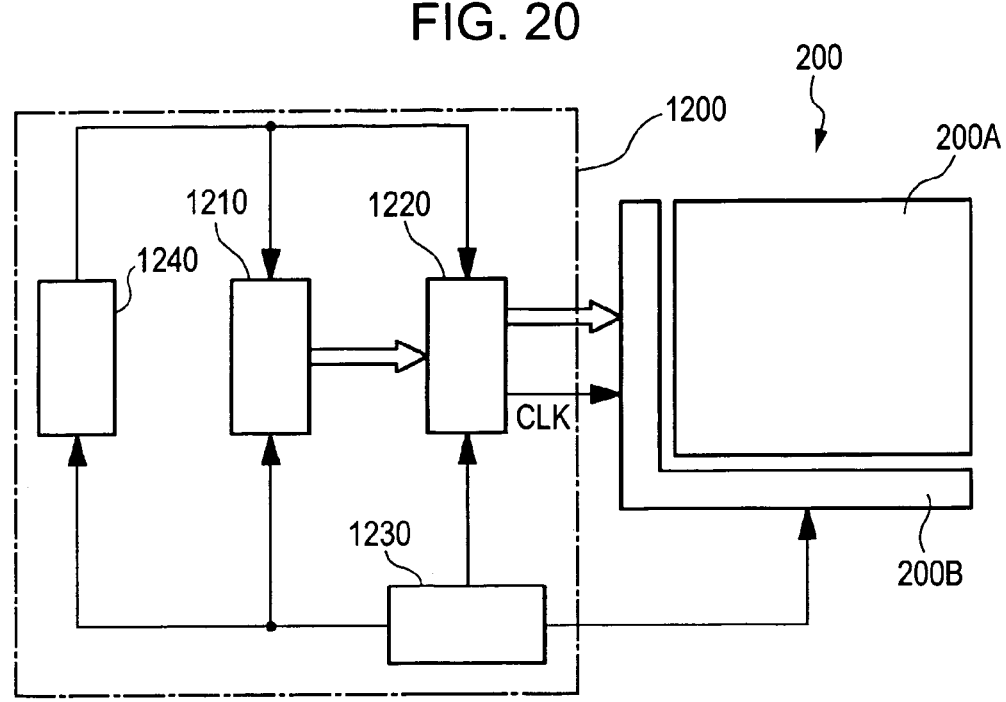
FIG. 20 is a schematic block diagram showing an arrangement of an electronic apparatus according to the embodiments of the present invention.
Figure 21:
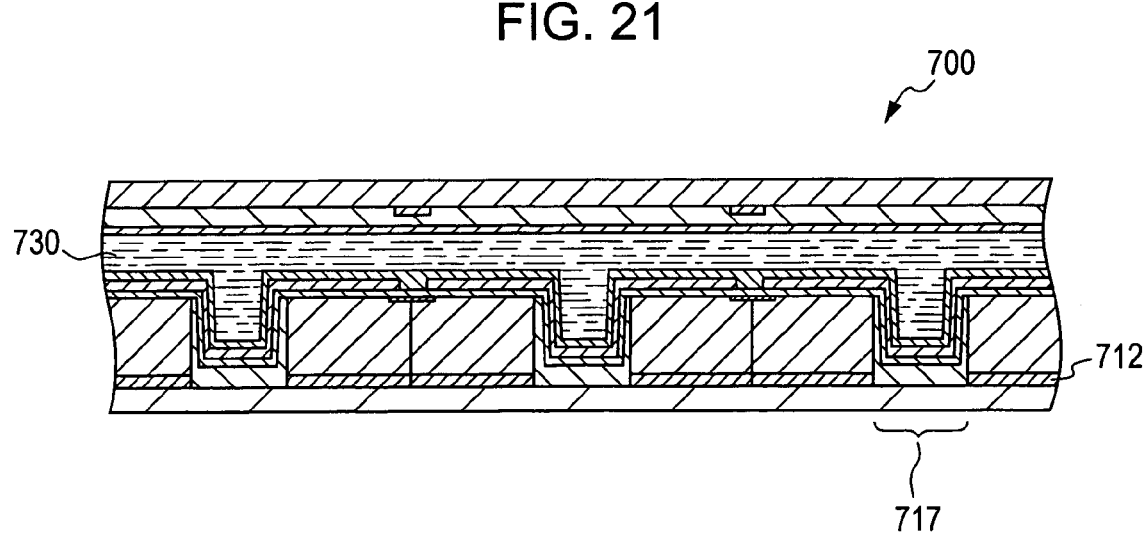
FIG. 21 is a diagram for illustrating a step of the conventional liquid crystal display device.

FIG. 20 is a schematic block diagram showing the arrangement of an electronic apparatus according to this embodiment of the present invention. The electronic apparatus comprises a liquid crystal panel 200 and control means 1200 for controlling the liquid crystal panel 200. Further, in FIG. 20, the liquid crystal panel 200 is schematically shown divided by a panel structure 200A and a driving circuit 200B having a semiconductor device (IC). In addition, preferably, the control means 1200 comprises a display information output source 1210, a display processing circuit 1220, a power supply circuit 1230, and a timing generator 1240.

In addition, the display information output source 1210 comprises memories such as ROMs (Read Only Memory) or RAMs (Random Access Memory); a storage unit such as a magnetic storage disk or an optical storage disk; and a tuning circuit for outputting a digital image signal. Further, based on various clock signals generated by a timing generator 1240, display information is provided to the display information processing circuit 1220 in image signals having a predetermined format.

In addition, the display information processing circuit 1220 comprises various well-known circuits such as a serial-parallel converting circuit, an amplification and inverting circuit, a rotation circuit, a gamma correction circuit, and a clamp circuit to perform the processing of inputted display information. Image information is provided to the driving circuit 200B along with the clock signal CLK. Moreover, the driving circuit 200B comprises a scanning line driving circuit, a data electrode driving circuit and a test circuit. Further, the power supply circuit 1230 serves to supply the predetermined voltages to the above-mentioned elements, respectively.

In addition, according to the electronic apparatus of the present embodiment, the formation position of the step arranged in the liquid crystal display device which directly and indirectly contacts the liquid crystal material and the formation position of the gap between the adjacent first wiring patterns and the adjacent second wiring patterns match. Accordingly, an electronic apparatus having excellent contrast and reliability can be provided.

INDUSTRIAL APPLICABILITY

According to the present embodiment, the formation position of a step arranged in the liquid crystal display device and the formation position of a gap between the adjacent first wiring patterns and the adjacent second wiring patterns match. As a result, the effect of alignment defects can be reduced to provide a liquid crystal display device having excellent contrast.

Accordingly, the liquid crystal display device of the present invention can be used for a mobile telephone, a personal computer, an LCD television, a view-finder type and a monitor direct-view type video tape recorder, a car navigation apparatus, a pager, an electrophoresis apparatus, an electronic organizer, a calculator, a word processor, a workstation, a video phone, a POS terminal, and an electronic apparatus comprising a touch panel.

What is claimed is:

1. A liquid crystal display device comprising:
   a first substrate;
   a second substrate opposite to the first substrate;
   a liquid crystal material interposed between the first substrate and the second substrate;
   a plurality of pixels including a first pixel and a second pixel that are adjacent to each other, the first pixel including a first pixel electrode and the second pixel including a second pixel electrode, an edge of the first pixel electrode and an adjacent edge of the second pixel electrode being separated by a gap;
   a reflecting region and a transmission region at each of the plurality of pixels, the reflecting region and the transmission region being successively formed adjacent to each other; and
   a layer that sets a thickness of the liquid crystal layer in the reflecting region to be thinner than a thickness of the liquid crystal layer in the transmission region that results in a step between the reflecting region of the first pixel and the transmission region of the second pixel, the step including an upper flat portion, a slope portion, and a lower flat portion, the edge of the first pixel electrode being substantially arranged on an upper portion of the slope portion of the step and the adjacent edge of the second pixel electrode being arranged at the lower flat portion of the step.

2. The liquid crystal display device according to claim 1, wherein the gaps, which are the electrical insulating regions, are slit shaped.

3. The liquid crystal display device according to claim 1, wherein the width of the steps is the same as the width of the gaps.

4. The liquid crystal display device according to claim 1, wherein the width of the steps is smaller than the width of the gaps.

5. The liquid crystal display device according to claim 1, wherein the width of the gaps is smaller than the width of the steps.

6. The liquid crystal display device according to claim 1, wherein the width of the gaps is 1 to 50 μm.

7. The liquid crystal display device according to claim 1, wherein the steps are formed due to multiple gaps formed for adjusting retardation.

8. The liquid crystal display device according to claim 1, wherein the steps are formed due to a light shielding layer.

9. The liquid crystal display device according to claim 1, wherein the steps are formed due to an alignment protrusion formed for controlling alignment.

10. The liquid crystal display device according to claim 1, wherein the steps are formed due to an interlayer insulating layer.

11. The liquid crystal display device according to claim 1, wherein the steps are formed due to a photo spacer.

12. The liquid crystal display device according to claim 1, wherein the steps are formed due to a reflective scattering layer.

13. The liquid crystal display device according to claim 1, wherein the first substrate is a color filter substrate having color filters, and
wherein the second substrate is a switching substrate having switching devices.

14. An electronic apparatus comprising at least one of the liquid crystal display devices according to claim 1.

15. A liquid crystal display device comprising:
a first substrate;
a second substrate opposite to the first substrate;
a liquid crystal material interposed between the first substrate and the second substrate;
a plurality of pixels including a first pixel and a second pixel that are adjacent to each other, the first pixel including a first pixel electrode and the second pixel including a second pixel electrode, an edge of the first pixel electrode and an adjacent edge of the second pixel electrode being separated by a gap;
a reflecting region and a transmission region at each of the plurality of pixels, the reflecting region and the transmission region being successively formed adjacent to each other; and
a layer that sets a thickness of the liquid crystal layer in the reflecting region to be thinner than a thickness of the liquid crystal layer in the transmission region that results in a step between the reflecting region of the first pixel and the transmission region of the second pixel, the step including an upper flat portion, a slope portion, and a lower flat portion, the edge of the first pixel electrode being arranged on the upper flat portion of the step and the adjacent edge of the second pixel electrode being substantially arranged on a lower portion of the slope portion of the step.

16. A liquid crystal display device compromising:
a first substrate;
a second substrate opposite to the first substrate;
a liquid crystal material interposed between the first substrate and the second substrate;
a plurality of pixels including a first pixel and a second pixel that are adjacent to each other, the first pixel including a first pixel electrode and the second pixel including a second pixel electrode, an edge of the first pixel electrode and an adjacent edge of the second pixel electrode being separated by a gap;
a reflecting region and a transmission region at each of the plurality of pixels, the reflecting region and the transmission region being successively formed adjacent to each other; and
a layer that sets a thickness of the liquid crystal layer in the reflecting region to be thinner than a thickness of the liquid crystal layer in the transmission region that results in a step between the reflecting region of the first pixel and the transmission region of second pixel, the step including an upper flat portion, a slope portion, and a lower flat portion, the edge of the first pixel electrode being substantially arranged on an upper portion of the slope portion of the step and the adjacent edge of the second pixel electrode being substantially arranged on a lower portion of the slope portion of the step.

* * * * *